United States Patent [19]
Nakata

[11] Patent Number: 5,621,668
[45] Date of Patent: Apr. 15, 1997

[54] PREDICTION CONTROL METHOD AND A PREDICTION CONTROL DEVICE

[75] Inventor: Kazuki Nakata, Kadoma, Japan

[73] Assignee: Matsushita Electric Industrial Co., Ltd., Kadoma, Japan

[21] Appl. No.: 255,485

[22] Filed: Jun. 8, 1994

[30] Foreign Application Priority Data

Jun. 8, 1993 [JP] Japan .................................. 5-137092

[51] Int. Cl.⁶ .................................................. G04F 13/00
[52] U.S. Cl. ................... 364/569; 364/185; 364/550; 364/551.01; 395/903; 395/2.68; 395/55
[58] Field of Search ..................................... 364/569, 550, 364/554, 551.01, 187, 131, 148, 141, 150–152, 164, 185; 342/28, 29, 36; 371/9.1; 395/903–906, 2.68, 55, 907, 912, 914, 915

[56] References Cited

U.S. PATENT DOCUMENTS

| | | | |
|---|---|---|---|
| 4,777,585 | 10/1988 | Kohawa et al. | 395/903 |
| 4,839,823 | 6/1989 | Matsumoto | 395/61 |
| 4,847,749 | 7/1989 | Collins et al. | 395/575 |
| 5,142,612 | 8/1992 | Skeirik | 395/906 |
| 5,153,807 | 10/1992 | Saito et al. | 395/906 |
| 5,185,693 | 2/1993 | Loftis et al. | 364/187 |
| 5,233,545 | 8/1993 | Ho et al. | 364/569 |
| 5,311,421 | 5/1994 | Nomura et al. | 395/906 |

FOREIGN PATENT DOCUMENTS

| | | |
|---|---|---|
| 4-205604 | 7/1992 | Japan . |
| 4-295905 | 10/1992 | Japan . |
| 4-326012 | 11/1992 | Japan . |
| 5-52606 | 3/1993 | Japan . |

*Primary Examiner*—Emanuel T. Voeltz
*Assistant Examiner*—Hal D. Wachsman
*Attorney, Agent, or Firm*—Ratner & Prestia

[57] ABSTRACT

A prediction control method and apparatus. A value of at least one parameter representing a condition of an object to be controlled at predetermined intervals is detected and added to a history of the parameter stored in a storage device. The histories of the parameters from the storage device are read and whether each history satisfies a predetermined condition is judged. The history judged as satisfying the predetermined condition is stored to the storage device as warning data. A warning signal is generated in response to the judged histories.

20 Claims, 20 Drawing Sheets

FIG.2

| a1 Date field | a2 Data field | a3 Data field |
|---|---|---|
| 199301211010 | 1003.5 | 100.1 |
| 199301211011 | 980.4 | 105.1 |
| 199301211012 | 1010.4 | 93.8 |
| 199301211013 | 1100.2 | 90.9 |
| 199301211014 | 1005.0 | 101.2 |

FIG.3

| b1 Control item field | b2 Control reference minimum field | b3 Control reference maximum field |
|---|---|---|
| Withstand voltage | 800 | 1500 |
| Withstand current | 50 | 200 |
| . . . | . . . | . . . |
| . . . | . . . | . . . |
| . . . | . . . | . . . |

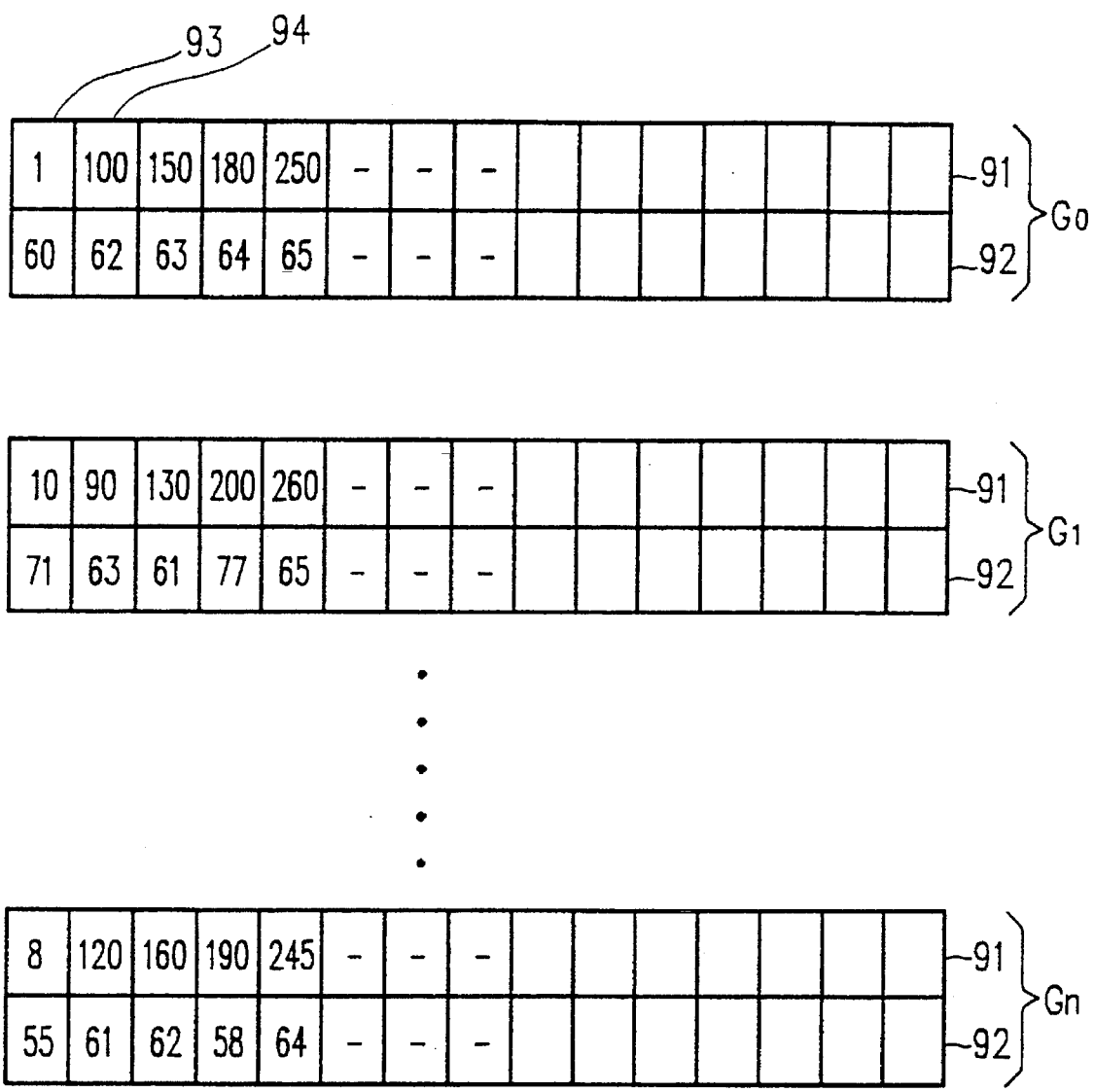

Number of wafers processed

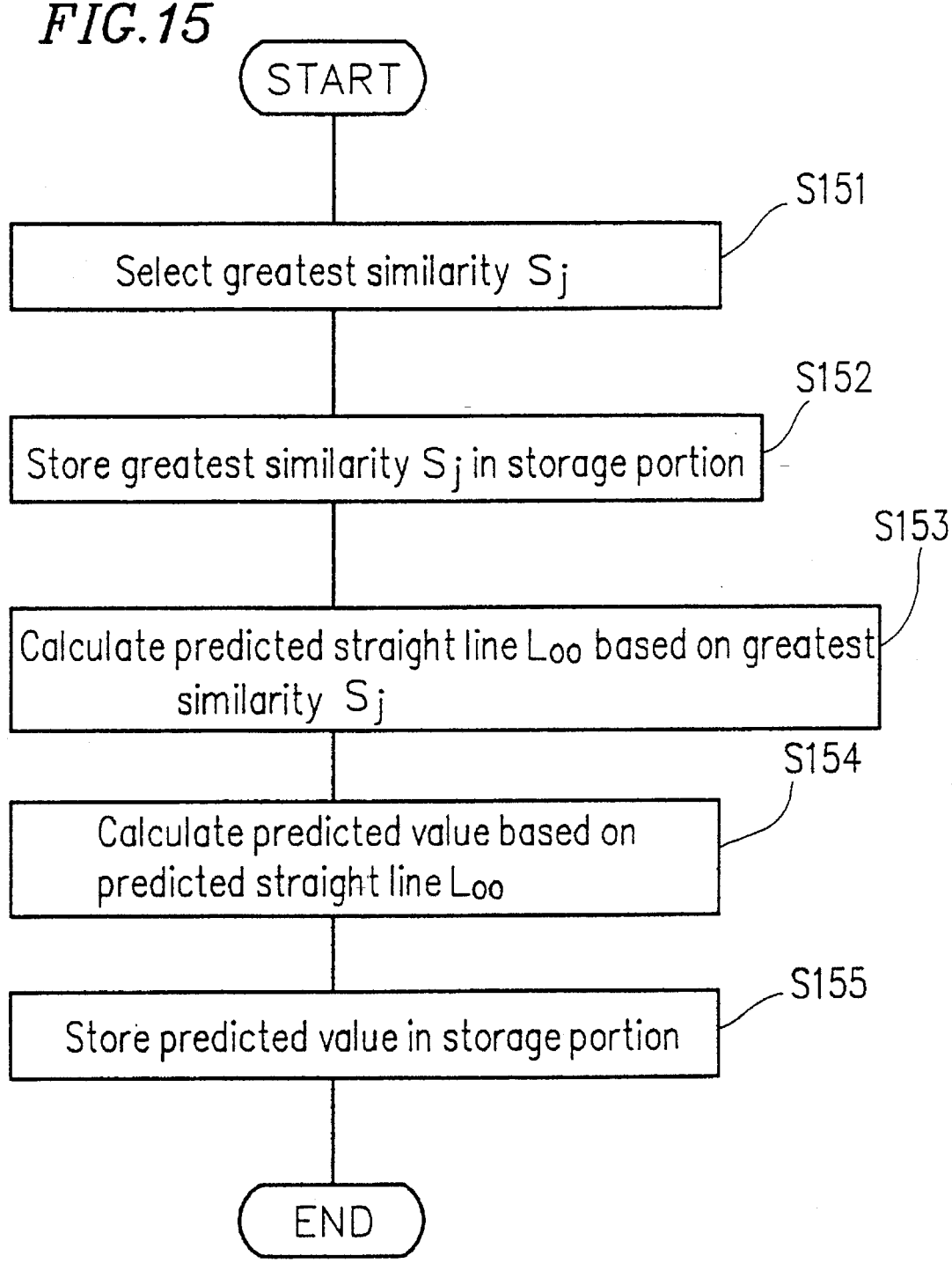

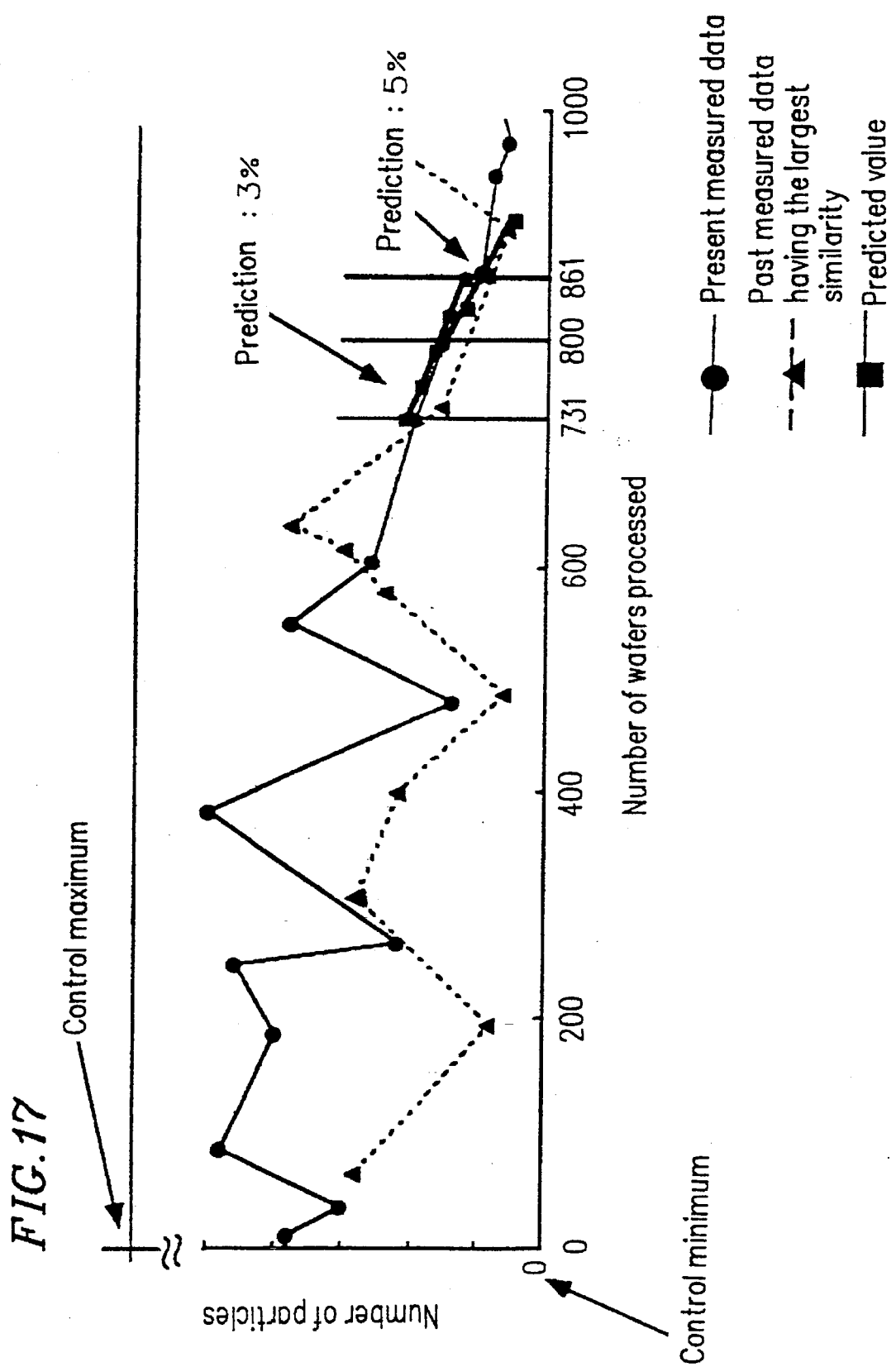

FIG.19

| | 93 | 94 | | | | | | | | | | | | | |
|---|---|---|---|---|---|---|---|---|---|---|---|---|---|---|---|
| 1 | 100 | 150 | 180 | 250 | - | - | - | | | | | | | | 91 |
| 60 | 62 | 63 | 64 | 65 | - | - | - | | | | | | | | 92 |

G0 — 191

| 10 | 90 | 130 | 200 | 260 | - | - | - | | | | | | | | 91 |
|---|---|---|---|---|---|---|---|---|---|---|---|---|---|---|---|
| 71 | 63 | 61 | 77 | 65 | - | - | - | | | | | | | | 92 |

G1 — 191

⋮

| 8 | 120 | 160 | 190 | 245 | - | - | - | | | | | | | | 91 |
|---|---|---|---|---|---|---|---|---|---|---|---|---|---|---|---|
| 55 | 61 | 62 | 58 | 64 | - | - | - | | | | | | | | 92 |

Gn — 191

5,621,668

PREDICTION CONTROL METHOD AND A PREDICTION CONTROL DEVICE

BACKGROUND OF THE INVENTION

1. Field of the Invention

The present invention relates to a prediction control method for predicting a condition of an apparatus to be controlled and controlling the apparatus based on the result of the prediction, and a prediction control device realizing this method.

2. Description of the Related Art

In recent years, a prediction control method has been employed for controlling an apparatus. The method includes predicting a variation in a parameter representing a condition of the apparatus and controlling the apparatus based on the result of the prediction. Such a method is disclosed, for example, in Japanese Laid-Open Patent Publication No. 4-205604, titled "A prediction control method of a process and a prediction control system". The prediction control system disclosed in this document will be briefly described as follows.

FIG. 20 is a configuration of the disclosed prediction control system which is adopted to control the main steam temperature of a thermoelectric power plant. A steam temperature prediction system 30 predicts a near-future value of the steam temperature using a steam temperature model expressed by a differential equation based on the law of conservation of mass and the law of energy conservation. The plant is controlled based on the result of the prediction.

Such a conventional prediction control system as shown in FIG. 20 has disadvantages as follows. When it is difficult to clearly specify the characteristic of a parameter for a condition of an apparatus to be controlled, a model expressed by an equation is not available. As a result, high-accuracy prediction cannot be obtained. Especially in the case where the characteristics of a plurality of parameters are interrelated, frequently it is impossible to express the characteristic of one parameter by an equation. Further, in the case where the value of a parameter cannot be extracted at a real time or in a periodic manner, an accurate value of a variation in the parameter is not obtained. This makes it difficult to use a model expressed by a differential equation which requires variations in a parameter measured at significantly short intervals.

SUMMARY OF THE INVENTION

The prediction control method of this invention comprises the steps of: detecting a value of at least one parameter representing a condition of an object to be controlled at irregular intervals, and adding the detected value to a history of the parameter stored in a storage means; reading the histories of the parameters from the storage means, judging whether each history satisfies a predetermined condition, and storing the history judged as satisfying the predetermined condition to the storage means as warning data; and generating a warning signal corresponding to the judgment in the step of reading the histories.

Alternatively, the prediction control method of this invention comprises the steps of: detecting values of a plurality of parameters including a parameter representing a lapse of time for a plurality of times at irregular intervals, and storing the values of the plurality of parameters in storage means as a set of time series data; calculating the similarity of two sets of time series data including the latest set of time series data among sets of time series data stored in the storage means using the similarity of the parameter representing the lapse of time in the two sets of time series data as a weight; and predicting a near-future value of any of the plurality of parameters other than the parameter representing the lapse of time using the set of time series data having the greatest similarity to the latest set of time series data.

In another aspect of the present invention, a prediction control device comprises data detecting means for detecting a value of at least one parameter representing a condition of an object to be controlled at irregular intervals; storage means for storing a history of the data of the parameter; predicting means for reading the history of the parameter from the storage means, judging that the value of the parameter will be deviated from a reference range in the near future when the history satisfies a predetermined condition, and storing the history judged as being deviated from the reference range as warning data; and generating a warning signal corresponding to the judgment of the predicting means.

Alternatively, the prediction control device comprises: data detecting means for detecting values of a plurality of parameters including a parameter representing a lapse of time for a plurality of times at irregular intervals; storage means for storing the values of the plurality of parameters during a predetermined period of time as a set of time series data; similarity calculating means for calculating the similarity of two of the sets of time series data stored in the storage means using the similarity of the parameter representing the lapse of time in the two sets of time series data as a weight, one of the two sets of the time series data being the latest set of time series data; and predicting means for predicting a near-future value of any of the plurality of parameters other than the parameter representing the lapse of time using the set of time series data having the greatest similarity to the latest set of time series data.

Thus, the invention described herein makes possible the advantages of (1) providing a prediction control method for predicting a near-future value of a parameter for a condition of an apparatus to be controlled without using a model expressed by an equation, and (2) providing a prediction control device realizing the above method.

These and other advantages of the present invention will become apparent to those skilled in the art upon reading and understanding the following detailed description with reference to the accompanying figures.

BRIEF DESCRIPTION OF THE DRAWINGS

FIG. 2 shows a configuration of a data record file according to the present invention.

FIG. 3 shows a configuration of a control reference data file according to the present invention.

FIG. 9 shows a configuration of a storage portion storing measured data according to the present invention.

FIG. 15 is a flowchart showing a process of calculating a predicted value of the number of particles according to the present invention.

FIG. 17 shows a result of prediction obtained by the prediction control device according to the present invention.

FIG. 19 shows a configuration of a storage portion provided with a flag region for storing a flag according to the present invention.

FIGS. 21A–21D are diagrams showing exemplary similarity functions, as described in Table 2.

DESCRIPTION OF THE PREFERRED EMBODIMENTS

The present invention will be described by way of example with reference to the accompanying drawings as follows.

EXAMPLE 1

Figure 1:
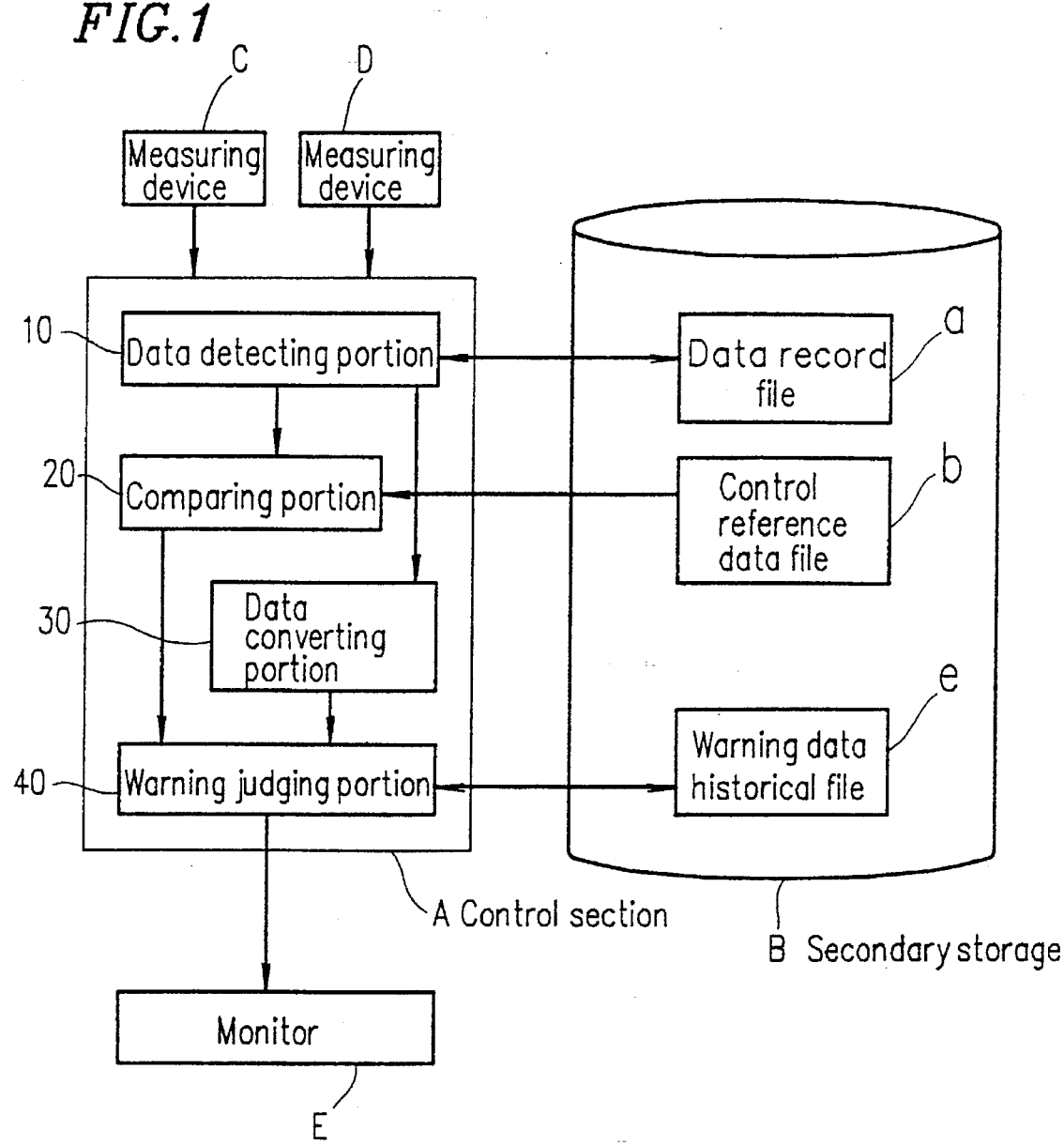
FIG. 1 is a functional block diagram showing a configuration of a first example of a prediction control device according to the present invention.

FIG. 1 shows a configuration of a first example of a prediction control device according to the present invention. The prediction control device of this example includes a control section A, a secondary storage B such as a hard disk, and a monitor E such as a CRT and a liquid crystal display device for displaying a message for warning the operator.

The control section A includes a data detecting portion 10, a comparing portion 20, a data converting portion 30, and a warning judging portion 40. The data detecting portion 10 detects numerical data representing a condition of an apparatus and sends the data to the comparing portion 20, which compares the numerical data with a control reference and outputs a signal to the warning judging portion 40 when the numerical data is not within the control reference. The data detecting portion 10 also sends the numerical data to the data converting portion 30, which converts the numerical data into graphic data and sends the graphic data to the warning judging portion 40. On receipt of the signal from the comparing portion 20 and/or the graphic data from the data converting portion 30, the warning judging portion 40 outputs a warning signal to the monitor E.

The secondary storage B connected to the control section A includes a data record file a, a control reference data file b, and a warning data historical file e. Data from the data detecting portion 10 is stored in the data record file a, and control reference data has been previously stored in the control reference data file b to be used by the comparing portion 20.

The operation of the prediction control device shown in FIG. 1 will be described. In the following description, the prediction control is conducted depending on a temporal change in the value for a specified condition of an apparatus to be controlled.

Each of measuring devices C and D which are connected to the control section A measures a value for one condition of the apparatus (hereinafter, such a condition used for the prediction control of the apparatus is referred to as "control item"). The measured value is received by the data detecting portion 10 and stored in the data record file a in the secondary storage B together with the time of the measurement. FIG. 2 shows an example of the configuration of the data record file a. The values measured by the measuring devices C and D are stored in data fields a2 and a3 as numerical data, respectively, with the time of the measurement being stored in a date field a1.

Not only being stored in the data record file a, the measured numerical data is also sent to the comparing portion 20 from the data detecting portion 10. On receipt of the numerical data, the comparing portion 20 reads control reference data from the control reference data file b so as to examine whether or not the numerical data measured at the measuring portion C or D is within the control reference. FIG. 3 shows an example of the configuration of the control reference data file b, which includes a control item field b1, a control reference minimum field b2, and a control reference maximum field b3 for storing the name of the control item, and the minimum and maximum of the control reference, respectively. The minimum and maximum of the control reference are values decreased and increased by 10% from a standard value of the control item, respectively. By establishing such values, it is possible to predict an occurrence where the numerical data for a control item deviates from the standard value before it actually occurs. The comparing portion 20 compares the numerical data measured by the measuring device C or D with the minimum and the maximum of the control reference for the control item, and judges whether or not the numerical data is within the control reference. When the numerical data measured by either of the measuring devices is not within the control reference, a signal is output from the comparing portion 20 to the warning judging portion 40 indicating that there exists a control item having deviated numerical data.

The data detecting portion 10 also reads numerical data measured during the previous week from the data record file a, and sends the data to the data converting portion 30 together with the numerical data measured at the present time. The data converting portion 30 converts these numerical data into graphic data composed of binary numbers and sends the graphic data to the warning judging portion 40.

Figure 4:
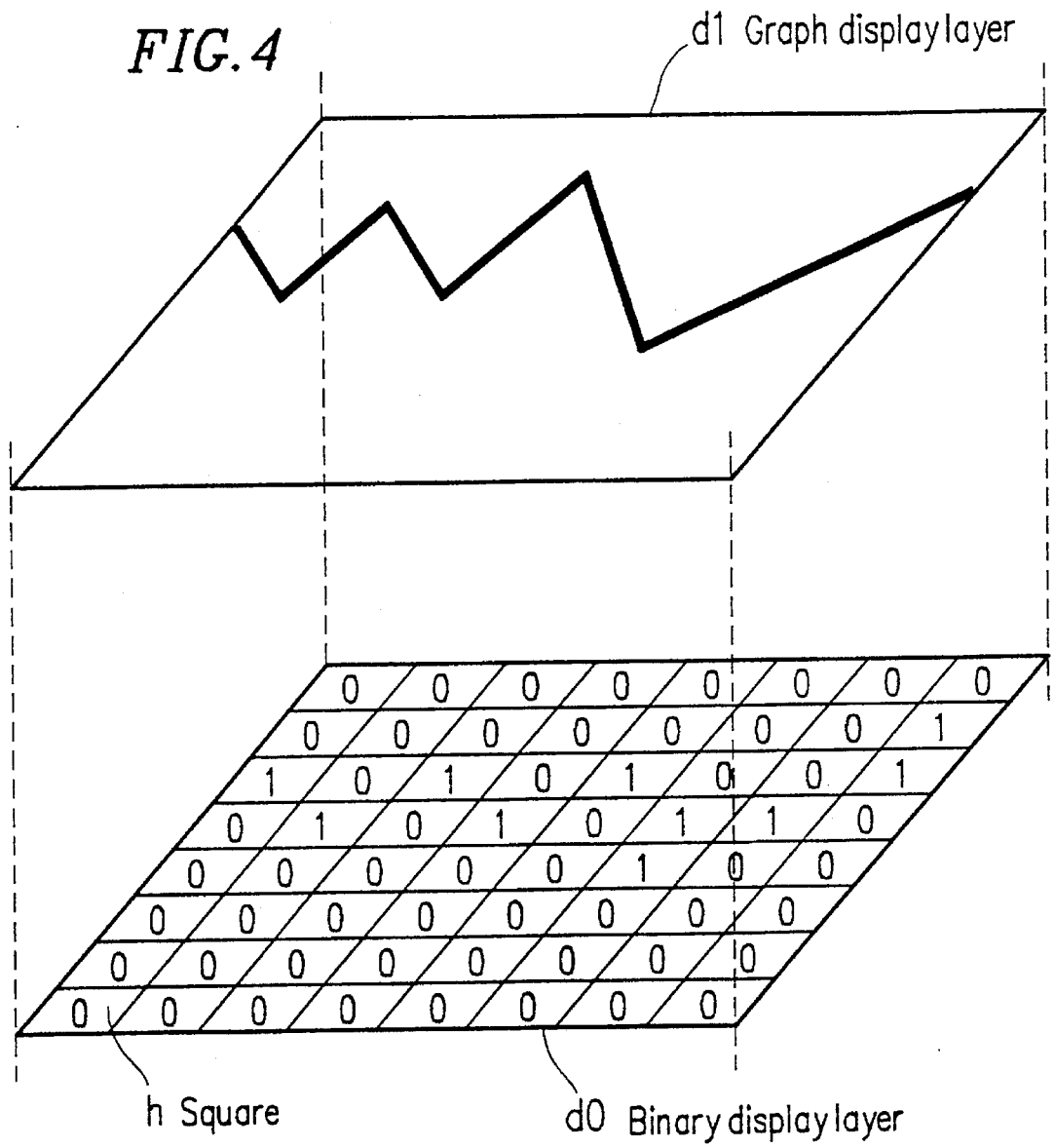
FIG. 4 is a view describing the conversion of numerical data into binary display data according to the present invention.

FIG. 4 shows an example of the graphic data including a binary display layer. Referring to FIG. 4, the operation of the data converting portion 30 will be described.

The data converting portion 30 first prepares a graph display layer on which a trend graph is drawn by plotting the numerical data covering the measurement during the last one week including the present time on the layer using the axis of abscissas (X axis) as a temporal axis. FIG. 4 shows a graph display layer d1 for a control item measured by the measuring device D. Then, the graph display layer d1 is converted into a binary display layer d0, which has the same size as that of the graph display layer d1 and divided into a plurality of small squares h. Each of the squares h may have a data value of 0 or 1. Which data value should be allocated to each square h depends on whether the square h overlaps a portion of a line of the trend graph when the graph display layer d1 is projected onto the binary display layer d0. The data value 1 is allocated to the squares overlapping a portion of the line of the trend graph, while the data value 0 is allocated to the squares not overlapping any portion of the line.

Figure 5:
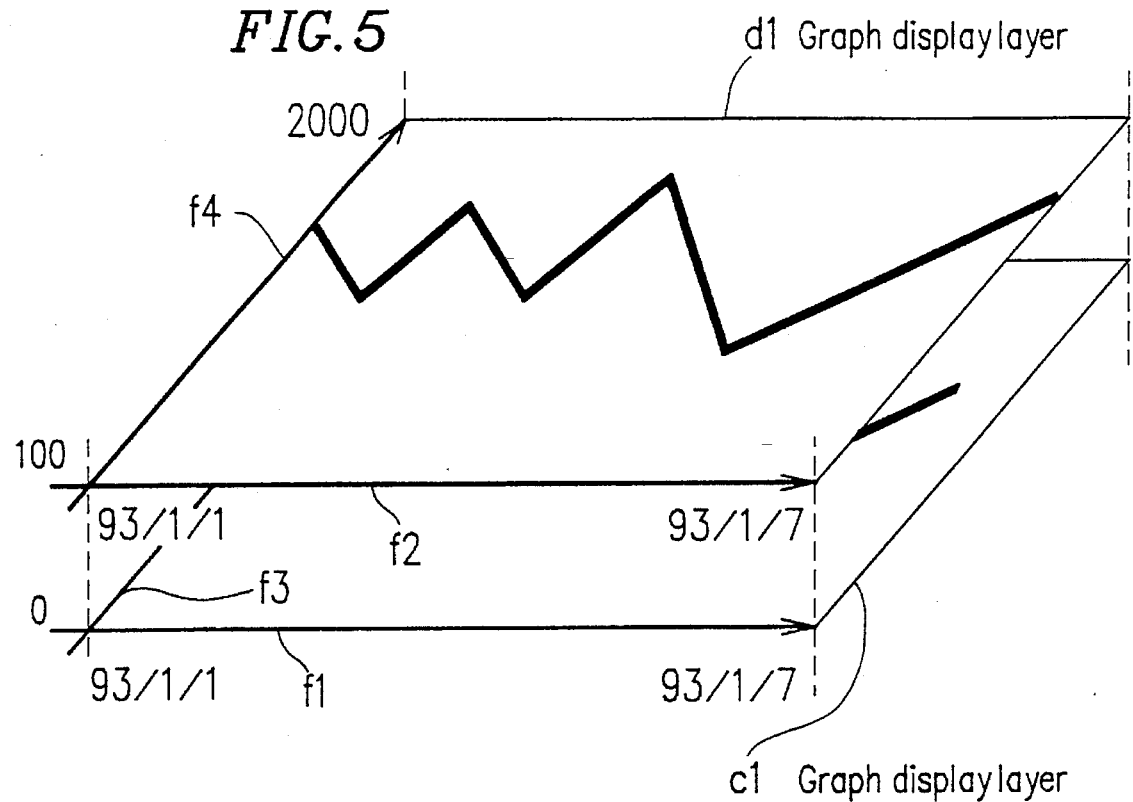
FIG. 5 shows graph display layers according to the present invention.

In this example, as shown in FIG. 5, two kinds of numerical data are obtained from the measuring devices C and D, and each is converted into graphic data. A graph display layer c1 for the control item measured by the measuring device C has the same size as that of the graph display layer d1 for the control item measured by the measuring device D. The scales of temporal axes f1 and f2, i.e., the X axes of the trend graphs on the graph display layers c1 and d1 respectively are the same. However, the scales of Y axes f3 and f4 of the trend graphs on the graph display layers c1 and d1 respectively are not necessary to be the same. For example, the scales of the Y axes may be set so that the trend graph for the measuring device C will be drawn on the upper half of the graph display layer c1 while the trend graph for the measuring device D will be drawn on the lower half of the graph display layer d1. In such a case, the squares having the data value 1 are present only on the upper half of a binary display layer c0 for the measuring device C, while the squares having the data value 1 are present only on the lower half of the binary display layer d0 for the measuring device D. Similarly, when more than two control items are used, the scales of the Y axes of the trend graphs for the respective control items can be set so that the trend graphs are deviated from one another. In any case, the scales of the Y axes of the trend graph for each control item should always be the same.

Figure 6:
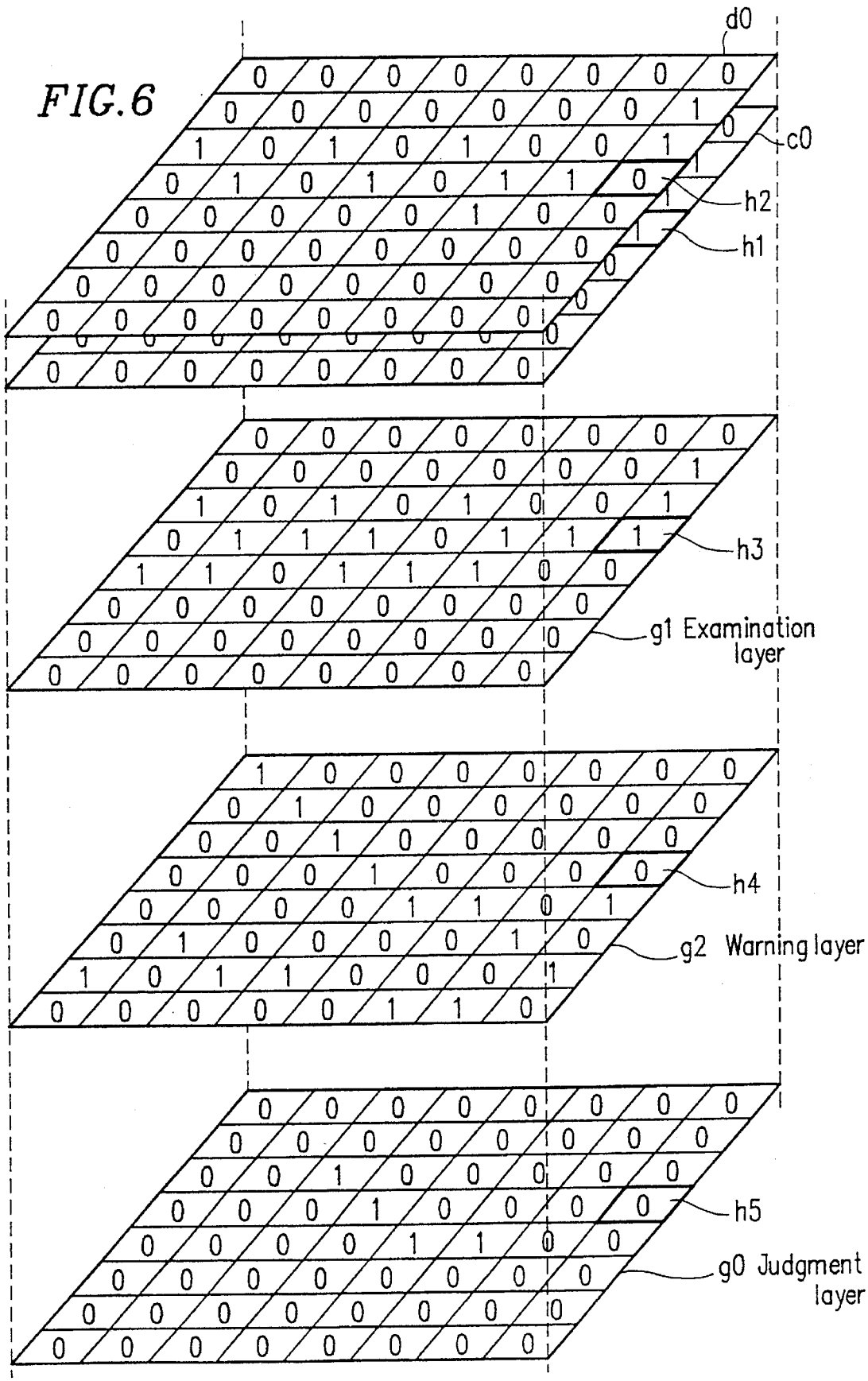
FIG. 6 shows the relationship among an examination layer, a warning layer, and a judgment layer according to the present invention.

On receipt of the graphic data converted from the numerical data for the control items, the warning judging portion 40 judges from the graphic data whether the apparatus to be controlled requires warning in the near future, i.e., whether any of the values for the control items are to be deviated from the control reference in the near future. For this judgment, a judgment layer g0, as shown in FIG. 6, is used. Referring to FIG. 6, the process of the judgment by the warning judging portion 40 will be described.

First, an examination layer g1 is prepared from the binary display layer c0 for the measuring device C and the binary display layer d0 for the measuring device D. The examination layer g1 is also divided into a plurality of squares each having a data value of 0 or 1. The data value for each square of the examination layer g1 is determined by calculating a logical OR of the data values of the corresponding squares of the binary display layers c0 and d0. For example, as shown in FIG. 6, the data value for a square h3 of the examination layer g1 is determined as 1 because the value of a corresponding square h1 of the binary display layer c0 is 1 and the value of a corresponding square h2 of the binary display layer d0 is 0.

After the examination layer g1 is prepared as described above, the judgment layer g0 is prepared based on the examination layer g1 and a warning layer g2 read from the warning data historical file e. As will be detailed later, the warning data historical file e includes, as warning layers, one or more examination layers which have been judged as "warning required". Each judging layer for all the warning layers stored in the warning data historical file e is prepared every time the prediction control device conducts new prediction control operation. The judgment layer g0 is prepared as follows. The data value for each square of the judgment layer g0 is determined by calculating a logical AND of the data value of the corresponding square of the examination layer g1 and the data value of the corresponding square of the warning layer g2. For example, as shown in FIG. 6, the data value for a square h5 of the judgment layer g0 is determined as 0 because the value of the corresponding square h3 of the examination layer g1 is 1 and the value of a corresponding square h4 of the warning layer g2 is 0. Thus, the judgment layer g0 composed of squares having data values equal to the logical AND of the corresponding squares of the examination layer g1 and the warning layer g2 is prepared.

The warning judging portion 40 judges whether or not warning is required based on the judgment layer g0. The warning judging portion 40, on the other hand, judges as "warning required" without using the judgment layer g0 as the basis of the judgment if it receives the signal indicative of the existence of a control item having deviated numerical data as described above. When the warning judging portion 40 has not received such a signal, the judgment layer g0 is used as the basis of the judgment in the following manner. The judgment layer g0 is judged as "warning required" if the rate of the number of squares having the data value 1 to the total number of squares of the judgment layer g0 exceeds a predetermined value. This judgment operation is repeated for each of the judgment layers prepared, though the repeat of the judgment operation is immediately terminated when the judgment layer under the operation is judged as "warning required".

When the warning judging portion 40 judges as "warning required", it outputs a signal to the monitor E shown in FIG. 1, which then displays a warning message thereon. Simultaneously, the examination layer g1 used when the judgment "warning required" is given is recorded as warning data in the warning data historical file e.

Figure 7:
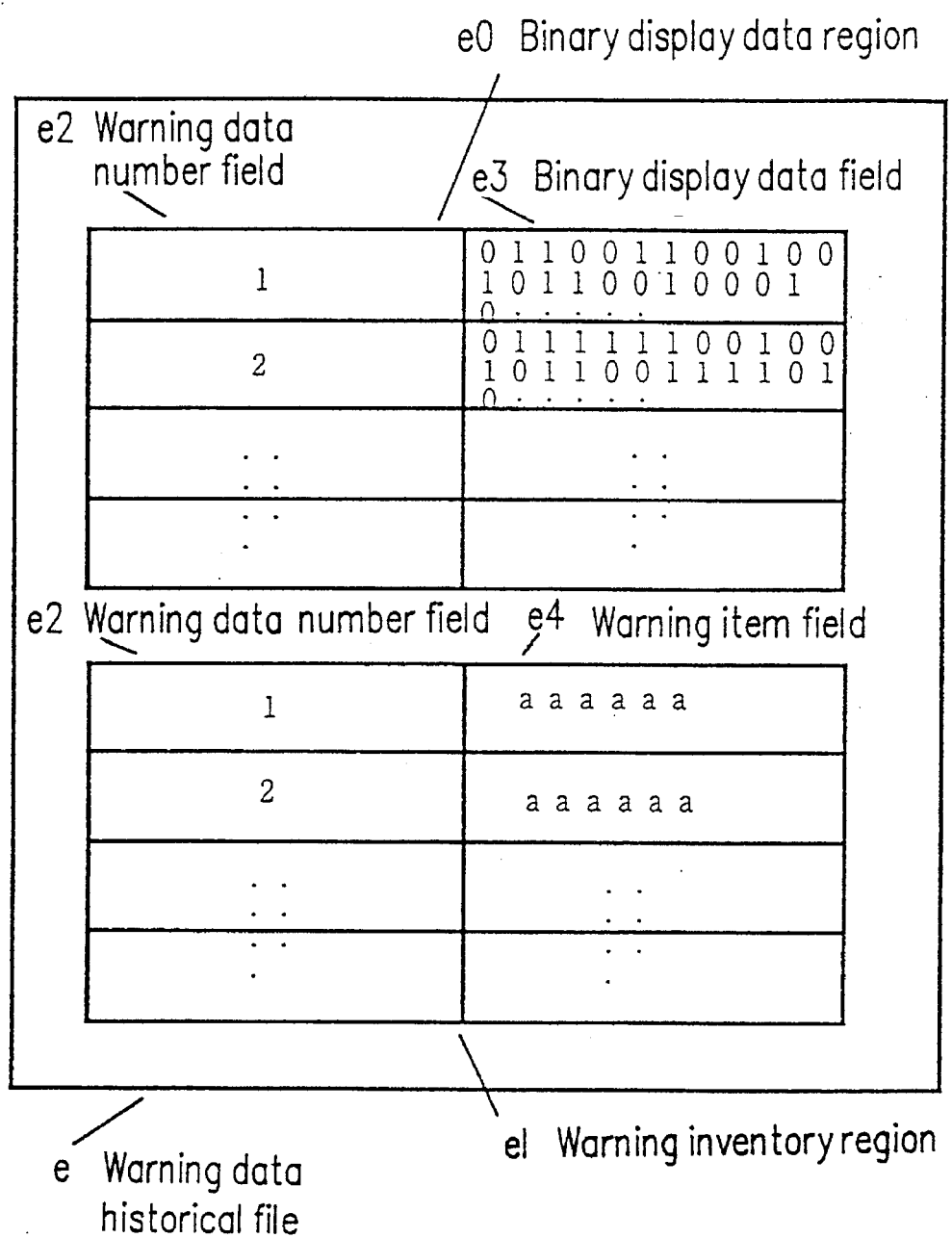
FIG. 7 shows a configuration of a warning data historical file according to the present invention.

FIG. 7 shows an example of the configuration of the warning data historical file e, which is divided into two regions, a binary display data region e0 and a warning inventory region e1. The binary display data region e0 is composed of a warning data number field e2 for storing unique warning data region numbers for all the warning data regions and a binary display data field e3 for storing binary display data in the corresponding warning data regions. The examination layer g1 judged as "warning required" which is sent from the warning judging portion 40 is stored in the binary display data field e3. The warning inventory region e1 is composed of the warning data number field e2 and a warning item field e4 for storing control items requiring warning among the control item such as withstand voltage and withstand current stored in the control item field shown in FIG. 3. As the prediction operation is repeated, all the examination layers used when the judgment "warning required" is given are recorded and piled in the warning data historical file e, together with the names of the control items requiring warning. This makes it possible to judge whether or not the apparatus requires warning in consideration of a variation in numerical data of one control item together with a variation in numerical data of another control item.

In the above process of preparing layers, the positions where the trend graphs for the measuring devices C and D are drawn overlap each other. When the trend graphs overlap, however, there arises a possibility of judging as "warning required" even when the apparatus actually does not require warning. This is because the examination layer is prepared by calculating a logical OR of the binary display layers for all the control items.

In order to reduce the above possibility, the trend graphs are preferably drawn so as not to overlap each other. For example, as described above, when two control items are controlled, the trend graph for one control item may be drawn on the upper half of a corresponding graph display layer, while the trend graph for the other may be drawn on the lower half of a corresponding graph display layer. As a result, a binary display layer with squares having the data value 1 present only on the upper half thereof and a binary display layer with squares having the data value 1 present only on the lower half thereof are obtained. An examination layer prepared from these two binary display layers substantially the same as a binary display layer to which the above two graph display layers for the two control items are projected. This makes it possible to record data corresponding to numerical data for one control item which is not influenced by numerical data for other control items. Thus, prediction with higher accuracy is possible.

In this example, two control items were used for the prediction control of the apparatus. However, the same effects can be obtained when three or more control items are used. A variation in numerical data, not only the numerical data, may also be added as the control data to obtain a prediction control device with higher accuracy. In this case, control reference data for the variation should be added in the control reference data file, and warning data for the variation will be added in the warning data historical file.

In this example, the trend graph was drawn on the graph display layer using numerical data measured for one week. However, the period of the measurement is not limited to one week. The same effects can be obtained when the period of measurement for one day or one month, for example, is used for drawing the trend graph. Further, the same effects can be obtained when the binary display layer is prepared using a trend graph whose linewidth is used as the extent of the variation in data. Moreover, when the warning judging portion 40 judges a warning layer as "warning required", corresponding numerical data output from the measuring device may also be recorded in the secondary storage B. This will be helpful when investigating a cause for a trouble which may occur in the apparatus to be controlled.

Further, in this example, when the comparing portion 20 determines that the numerical data output from the data detecting portion 10 is not within the control reference, the warning judging portion 40 automatically judges as "warning required" in response to the signal sent from the comparing portion 20. However, the comparing portion 20 may not be connected to the warning judging portion 40. In such a case, the same effects as described above can be obtained.

EXAMPLE 2

Figure 8:
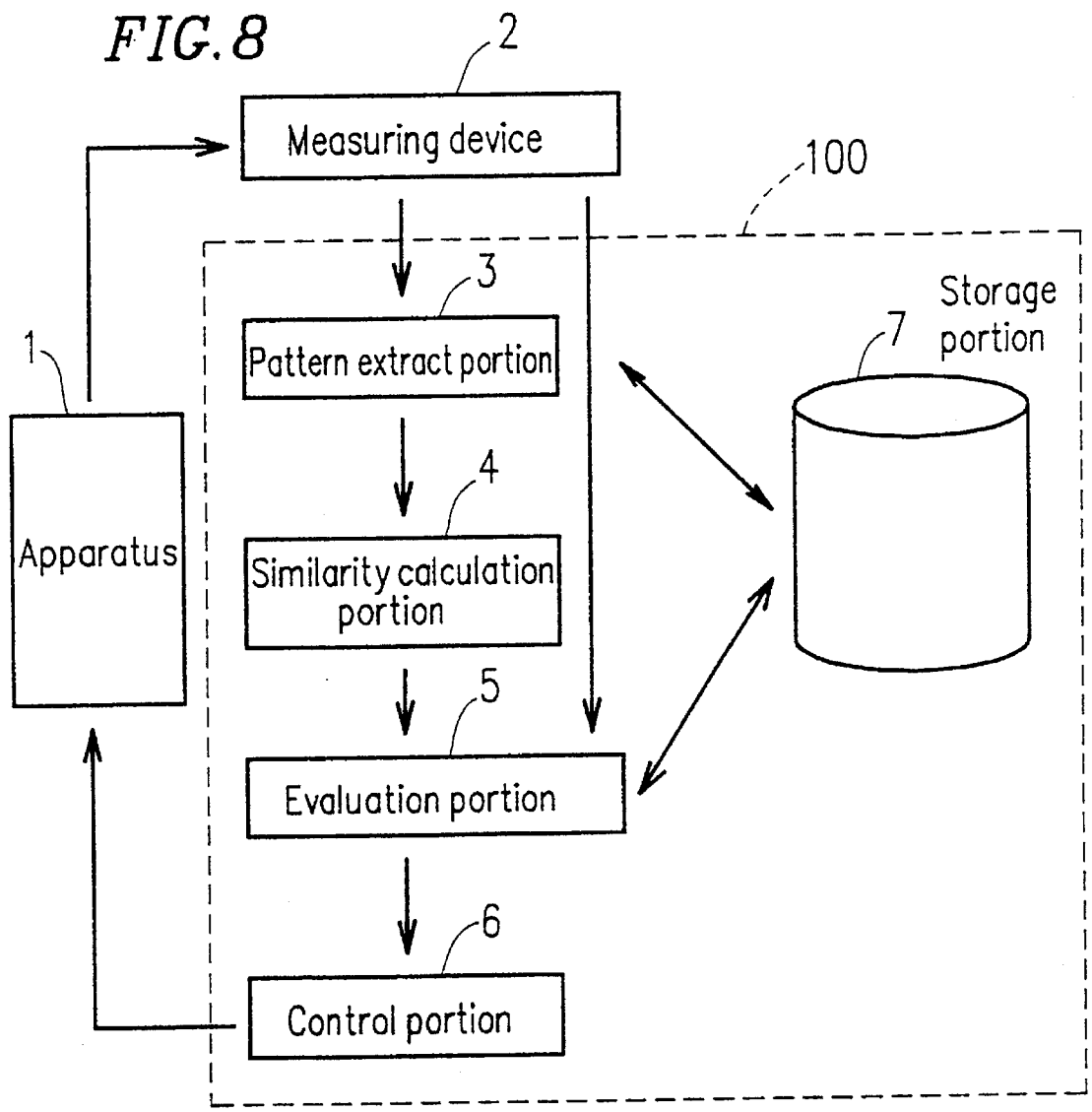
FIG. 8 is a functional block diagram showing a configuration of a second example of a prediction control device according to the present invention.

FIG. 8 shows a configuration of a second example of the prediction control device according to the present invention.

The prediction control device of this example is applicable to equipment used in the processes of fabricating semiconductor devices such as a dry etching apparatus, a CVD apparatus, an electric oven, and a cleaning apparatus.

Examples of parameters used for controlling conditions of such apparatuses are shown in Table 1 below.

TABLE 1

| Equipment | Parameters |
| --- | --- |
| Dry etching apparatus | Number of particles Etch rate Variation in etch rate |
| CVD apparatus | Film thickness Number of particles Deposition rate Variation in film thickness |
| Electric furnace | Number of particles Thickness of oxide film Variation in film thickness |
| Cleaning apparatus | Number of particles |

Referring to FIG. 8, a prediction control device 100 of this example includes a pattern extract portion 3 as data detecting means, a similarity calculation portion 4 as similarity calculating means and predicting means, an evaluation portion 5, a control portion 6, and a storage portion 7 as storage means. The prediction control device 100 is connected to a measuring device 2 which is connected to an apparatus 1 for fabricating semiconductor devices (hereinafter, simply referred to as an apparatus 1).

The operation of the prediction control device 100 with the above configuration will be described. In the following description, the apparatus 1 is assumed to be an apparatus for processing wafers, and a parameter representing a condition of the apparatus 1 is assumed to be the number of particles including dust which adhere to the wafer surface during the processing.

The number of particles on the wafer surface during the processing by the apparatus 1 is counted in the following manner, for example: First, the number of particles $N_S$ on the wafer surface before the processing by the apparatus 1 is counted by scanning the wafer surface using a laser scanning apparatus. Then, the number of particles $N_A$ on the wafer surface after the processing is counted by scanning the surface of the wafers using the laser scanning apparatus. The number of particles which adhere to the wafer surface during the processing is thus obtained by subtracting $N_S$ from $N_A$.

The measuring device 2 counts the number of particles which adhere to the wafer surface during the processing by the apparatus 1 at irregular intervals. For example, the first measurement may be conducted one day after a reference day which is the day of the latest maintenance of the apparatus 1. The second measurement may be conducted five days after the reference day, and the third measurement may be conducted seven days after the reference day. Simultaneously with the counting of the number of particles, the number of wafers processed by the apparatus 1 after the reference day until the present day is counted. The number of particles and the measured number of wafers are sent to the pattern extract portion 3 of the prediction control device 100.

The pattern extract portion 3 stores the received data in the storage portion 7. As shown in FIG. 9, the storage portion 7 includes a field 91 for storing the number of wafers and a field 92 for storing the number of particles. The number of wafers and the number of particles measured by the measuring device 2 are sequentially stored in the fields 91 and 92, respectively. For example, in FIG. 9, a column 93 indicates that 60 particles were counted on the wafer surface of the first wafer processed after the day when the latest maintenance of the apparatus 1 was conducted (hereinafter, this day is referred to as a reference time $T_0$). Likewise, a column 94 indicates that 62 particles were counted on the wafer surface of the 100th wafer processed after the reference time $T_0$. The maintenance is generally conducted at irregular intervals.

As shown in FIG. 9, the sets of the numbers of particles and the numbers of wafers stored in the storage portion 7 are divided into a plurality of groups $G_0$ to $G_n$ each starting whenever the maintenance of the apparatus 1 is conducted. The group $G_O$ includes the sets of the numbers of particles and the numbers of wafers measured during the period from the latest maintenance to the present time. The group $G_1$ includes the sets of the numbers of particles and the numbers of waters measured during the period from the second latest maintenance to the latest maintenance. Likewise, a group $G_k$ includes the sets of the numbers of particles and the numbers of waters measured during the period from the (k+1)-th latest maintenance to the k-th latest maintenance, where k=1, 2, ..., n.

Figure 10A:
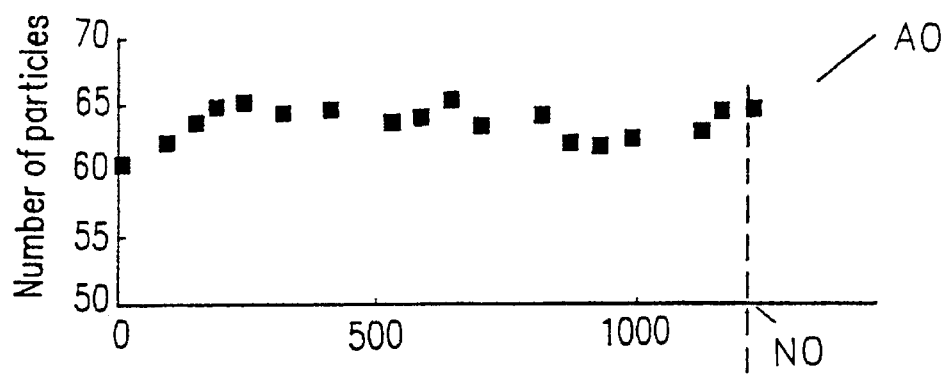
FIGS. 10A to 10C are trend graphs according to the present invention.
Figure 10B:
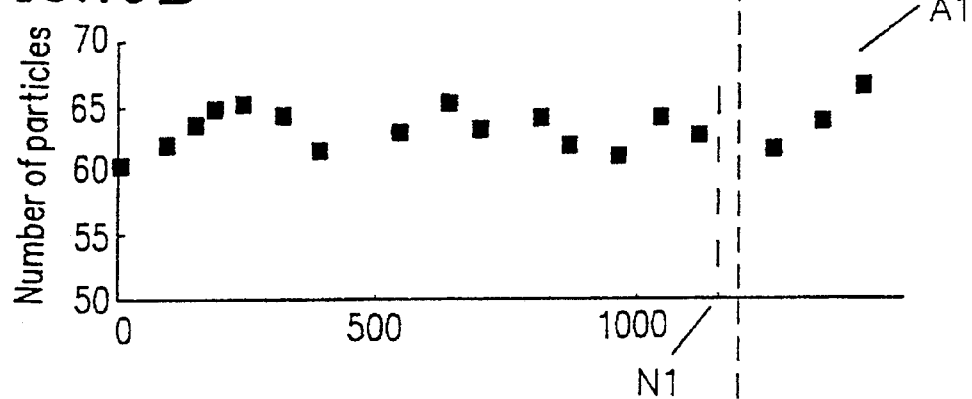
Figure 10C:
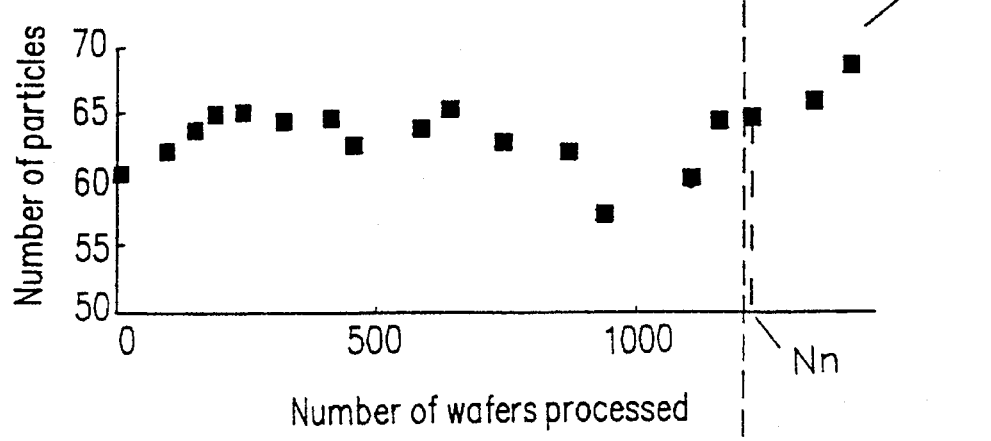

FIGS. 10A, 10B, and 10C show the relationship between the number of particles and the number of wafers stored in the storage portion 7 shown as a trend graph for the groups $G_0$, $G_1$, and $G_n$, respectively, selected from the groups $G_O$ to $G_n$. Hereinafter, trend graphs corresponding to the groups $G_O$ to $G_n$ are called trend graphs $A_0$ to $A_n$. The axis of abscissas (X axis) of each trend graph represents the number of wafers processed by the apparatus 1 counted from the latest maintenance. The number of wafers is reset to zero when a next maintenance is conducted. The axis of ordinates (Y axis) represents the number of particles.

In FIG. 10A, $N_0$ indicates the number of wafers processed by the apparatus 1 during the period from the latest maintenance to the present day. In FIG. 10B, $N_1$ indicates the number of wafers most approximate to the number $N_0$ among the numbers listed in the group $G_1$. In FIG. 10C, $N_n$ indicates the number of wafers most approximate to the number $N_0$ among the numbers listed in the group $G_n$. Likewise, $N_k$ indicates the number of wafers most approximate to the number $N_0$ among the numbers listed in the group $G_k$, where k=1, 2,, ..., n. The reason why the number $N_k$ is defined as described above is that, due to the irregular measurement of the number of particles and the number of wafers, the number of wafers identical to the number $N_0$ does not necessarily exist in the groups $G_1$ to $G_n$.

The pattern extract portion 3 reads the trend graphs $A_0$ to $A_n$ stored in the storage portion 7 and extracts patterns from the respective trend graphs.

Figure 11:
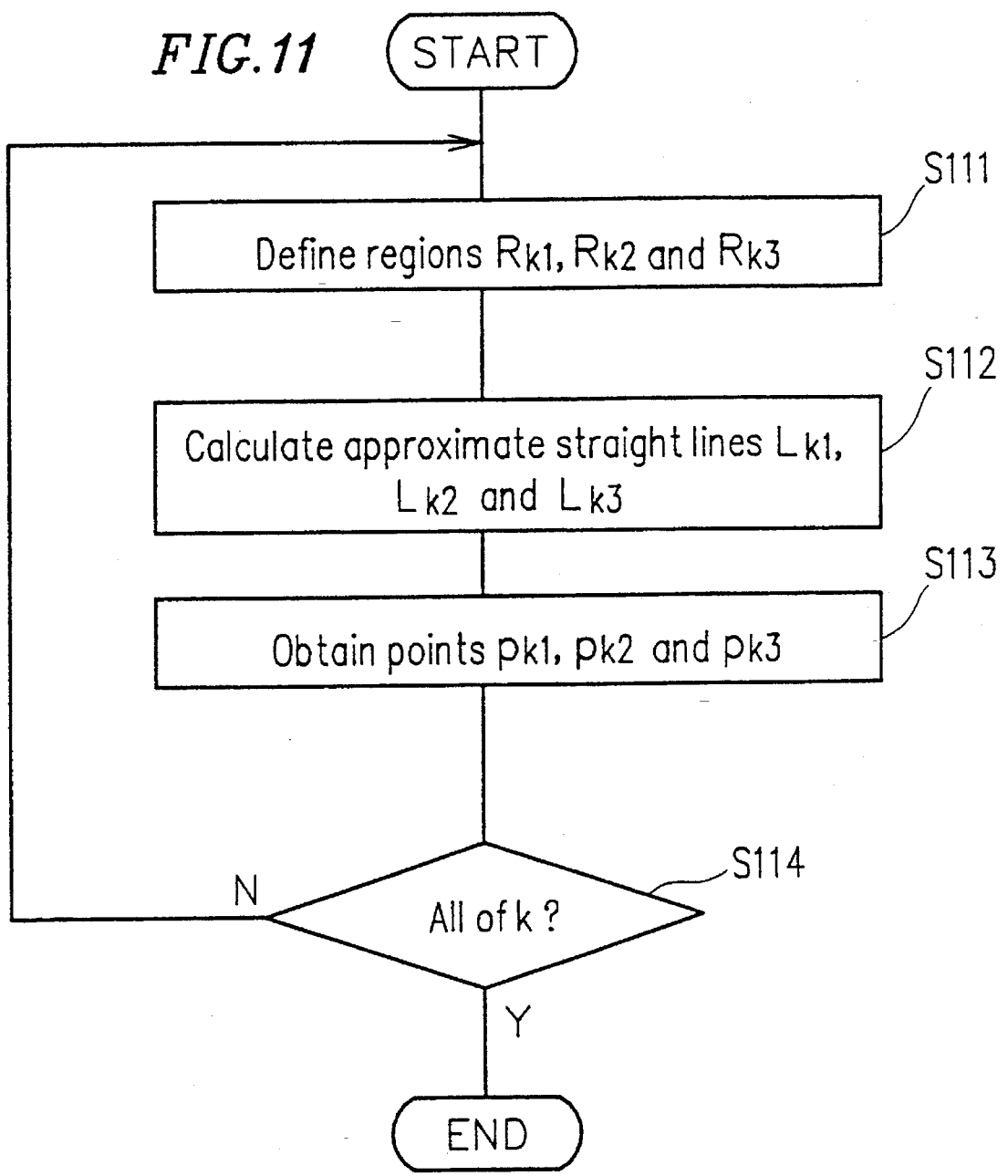
FIG. 11 is a flowchart showing a process of extracting patterns from the trend graphs according to the present invention.

Referring to FIG. 11, the process of extracting patterns from the respective trend graphs $A_0$ to $A_n$ conducted by the pattern extract portion 3 will be described.

At step S111, a predetermined number of regions are defined for the trend graph $A_k$. The regions are defined so that the number $N_k$ is included in any of the regions and that each of the regions contacts the adjacent one. The length of each region is determined depending on the type of the apparatus 1 and the number $N_k$. In this example, the number of regions is assumed to be 3 with the length of each region being equal to an average number of wafers to be processed by the apparatus 1 for ten days. The three regions for the trend graph $A_k$ are denoted by $R_{k1}$, $R_{k2}$, and $R_{k36l}$.

At step S112, an approximate straight line $L_{k1}$ in the region $R_{k1}$ of the trend graph $A_k$, an approximate straight line $L_{k2}$ in the region $R_{k2}$ thereof, and an approximate straight line $L_{k3}$ in the region $R_{k3}$ thereof are calculated by least square approximation, for example. In other words, the slopes of the approximate straight lines $L_{k1}$, $L_{k2}$, and $L_{k3}$ are calculated.

At step 113, a point $P_{k1}$ which has an X coordinate identical to that of the maximum number of wafers in the region $R_{k1}$ and lies on the approximate straight line $L_{k1}$ is obtained. Likewise, a point $P_{k2}$ which has an X coordinate identical to that of the maximum number of wafers in the region $R_{k2}$ and lies on the approximate straight line $L_{k2}$, and a point $P_{k3}$ which has an X coordinate identical to that of the maximum number of wafers in the region $R_{k3}$ and lies on the approximate straight line $L_{k3}$ are also obtained. In this way, a total of six values of the X and Y coordinates of the points $P_{k1}$, $P_{k2}$, $P_{k3}$ are obtained. The X coordinates of points $P_{k1}$ to $P_{k3}$ represent the numbers of wafers processed, and the Y coordinates thereof represent the numbers of particles.

The "pattern" as used herein is defined as a set of the nine values (the X and Y coordinates of the respective points $P_{k1}$ to $P_{k3}$ and the slopes of the approximate straight lines $L_{k1}$ to $L_{k3}$) which is referred to as a pattern $P_k$.

At step 114, whether the pattern $P_k$ has been extracted from the trend graph $A_k$ for all of k (k=1, 2, ..., n) is examined. Steps S111 through S113 are repeated until the extract of the pattern $P_k$ has been completed for all of k.

Figure 12A:
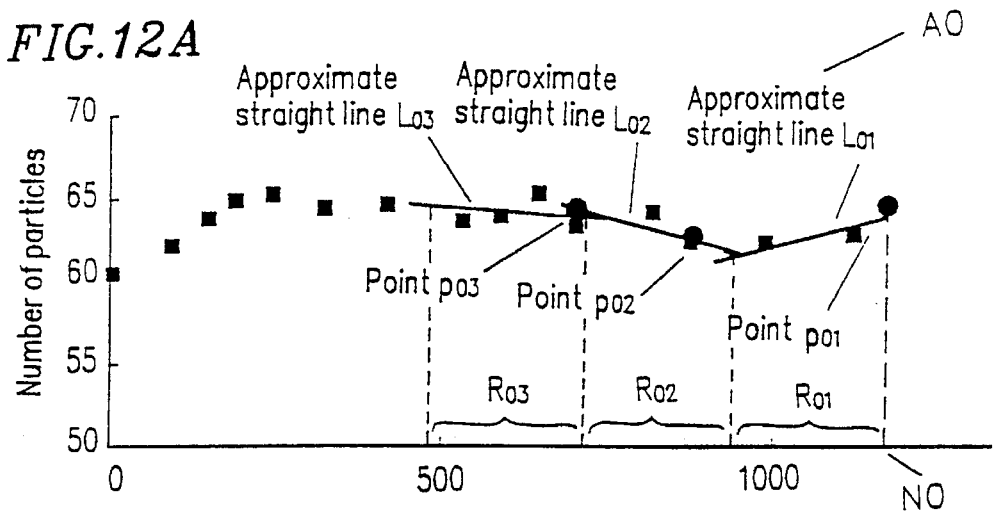
FIGS. 12A and 12B are patterns extracted from the trend graphs shown in FIGS. 10A and 10B, respectively.
Figure 12B:
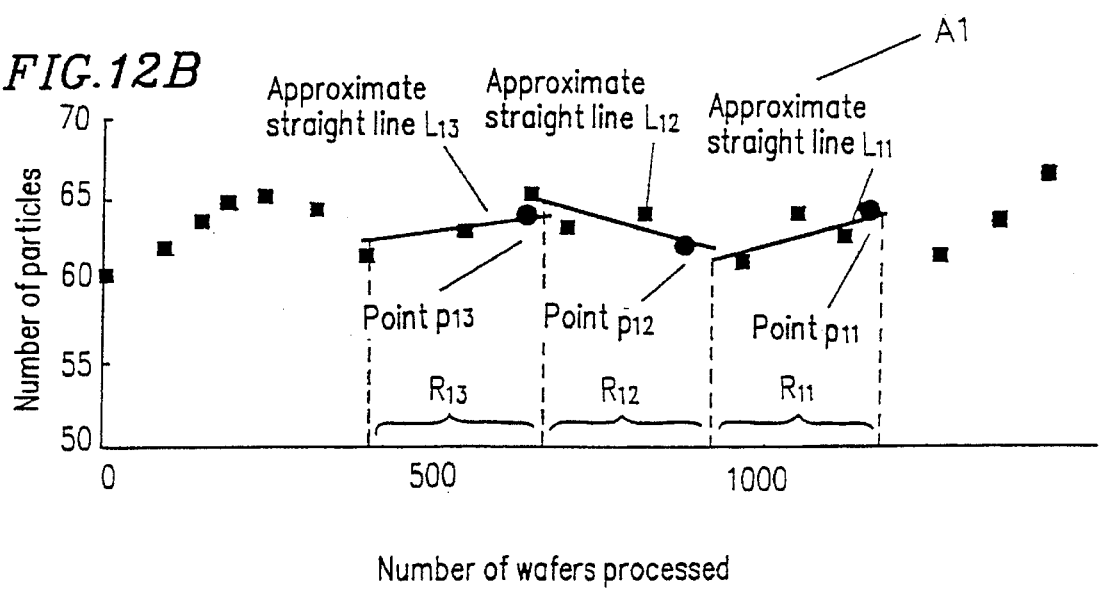

Patterns $P_0$ to $P_n$ are thus extracted from the trend graphs $A_0$ to $A_n$ by the pattern extract portion 3. The extracted patterns $P_0$ to $P_n$ are sent to the similarity calculation portion 4. FIGS. 12A and 12B show examples of patterns extracted from the trend graphs $A_0$ and $A_1$, respectively, by the pattern extract portion 3.

The similarity calculation portion 4 calculates similarities $S_1$ to $S_n$ of the trend graphs $A_1$ to $A_n$ to the trend graph $A_0$ based on the pattern $P_0$ to $P_n$. The "similarity" as used herein is defined as a degree of similarity between two trend graphs.

Figure 13:
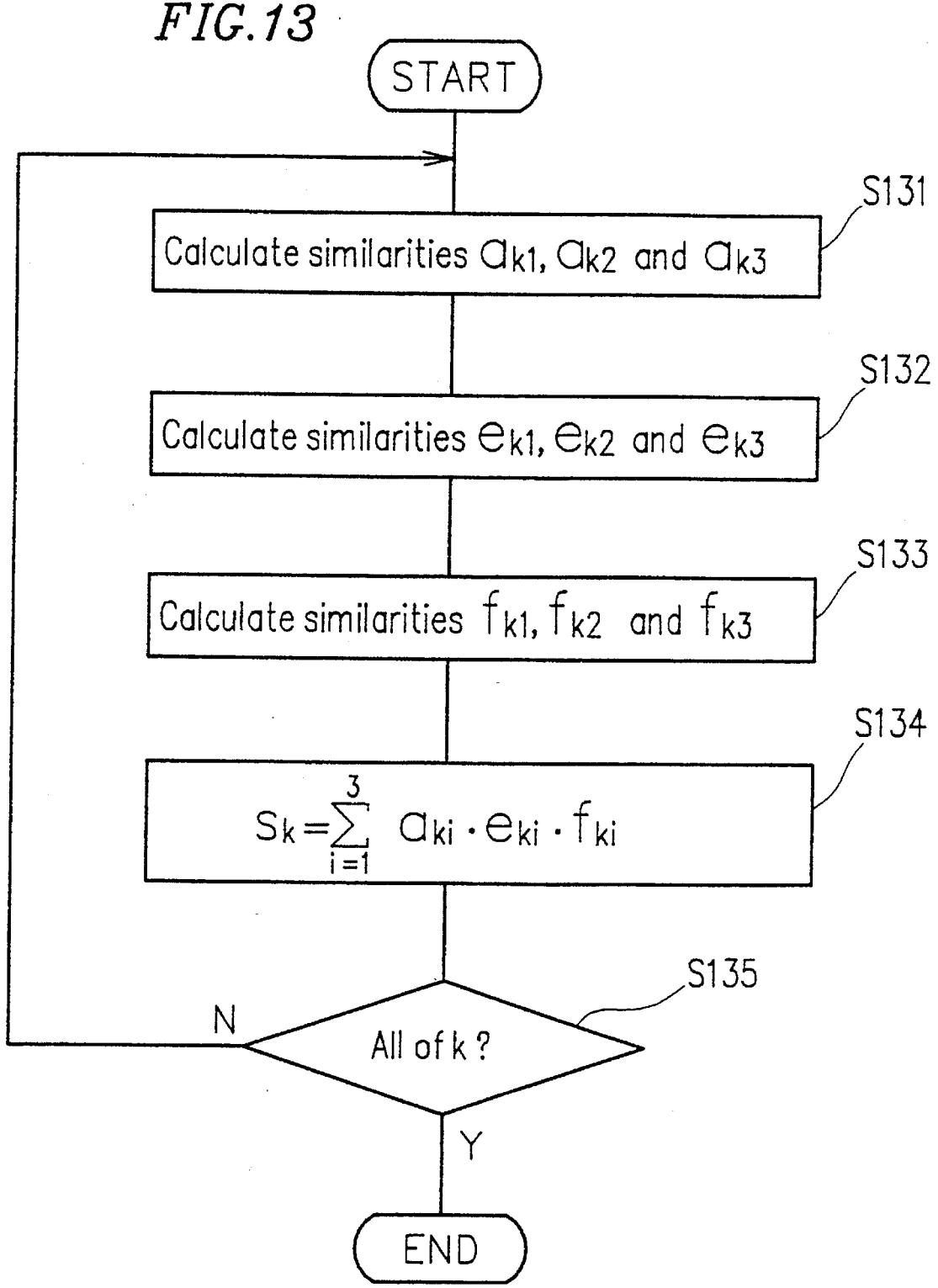
FIG. 13 is a flowchart showing a process of calculating the similarities according to the present invention.

Referring to FIG. 13, the process of calculating the similarities $S_1$ to $S_n$ conducted by the similarity calculation portion 4 will be described. According to the present invention, the number of wafers processed is taken into consideration as a factor of the similarity at the calculation of the similarity of a past trend graph to the present trend graph $A_0$. The similarity factor with regard to the number of wafers processed acts as a weight for the similarity factors with regard to the number of particles and the slope of the approximate straight line as will be detailed later.

At step S131, similarity factors $a_{k1}$, $a_{k2}$, and $a_{k3}$ with regard to the number of wafers processed are calculated. The similarity factor $a_{k1}$ indicates the similarity of the X coordinate of the point $P_{k1}$ in the trend graph $A_k$ to the X coordinate of the point $P_{01}$ in the trend graph $A_0$. Likewise, the similarity factors $a_{k2}$ and $a_{k3}$ indicate the similarities of the X coordinates of the points $P_{k2}$ and $P_{k3}$ in the trend graph $A_k$ to the X coordinates of the points $P_{02}$ and $P_{03}$ in the trend graph $A_0$, respectively.

Figure 14:
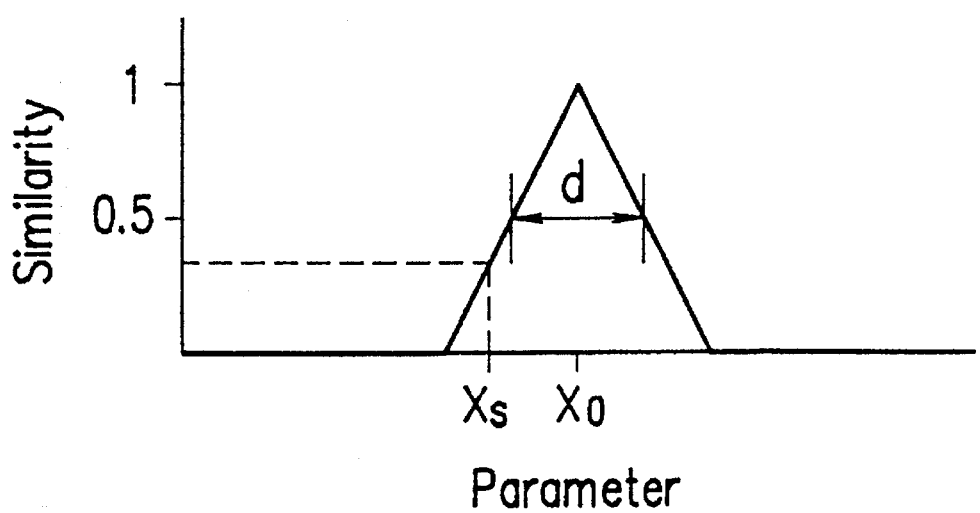
FIG. 14 shows a similarity function used in the present invention.

The calculation of the similarity of a comparative parameter to a reference parameter using a similarity function will be described. FIG. 14 shows an example of such a similarity function, where the X axis represents the value of a parameter and the Y axis represents the similarity. The value of the similarity function (i.e, similarity) reaches the maximum at a reference value $x_0$. d denotes a constant defining the difference of values of the comparative parameter having a similarity of 0.5. The constant d is predetermined corresponding to the type of the comparative parameter. A value $x_s$ of the comparative parameter when the value of the reference parameter is set to be equal to the reference value $x_0$ is plotted on the X axis. A value s corresponding to the value $x_s$ of the comparative parameter obtained by the trigonometric function is the similarity of the comparative parameter to the reference parameter.

The shape of the similarity function is not limited to that shown in FIG. 14. In general, a function $y=f(x)$ satisfying the following requirements (1) and (2) can be used as the similarity function.

(1) When a range satisfying $x<x_0$ (where $x_0$ is the value of x when f(x) is maximum) is divided into portions $X_i$ at predetermined intervals, the maximum value $f(x_i)$ of the portion $X_i$ monotonously decreases as x decreases.

(2) When a range satisfying $x \geq x_0$ is divided into portions $X_i$ at predetermined intervals, the maximum value $f(x_i)$ of the portion $X_i$ monotonously decreases as x increases.

Table 2 describes shapes of the function $y=f(x)$ which are especially preferable for the use as the similarity function, together with their applications and effects.

FIGS. 21A–21D show the shapes of the functions $y=f(x)$ that are described in Table 2.

TABLE 2

| Shape | Application | Effect |
| --- | --- | --- |
| See FIG. 21A | Applicable when the change in comparative parameter has no significant feature. | Applicable for any change. |
| See FIG. 21B | Applicable when a large change in similarity with the change in comparative parameter is not desired. | The values of the comparative parameter are judged as being similar even when they are largely different. Therefore, the range of data judged as being similar is large. |
| See FIG. 21C | Applicable when an exponentially large change in similarity with the change in comparative parameter is desired. | The values of the comparative parameter are judged as being little similar even when they are only slightly different. Therefore, only data significantly similar can be detected. |
| See FIG. 21D Note: In FIG. 21D, the width δ is identical with the period of the change in the comparative parameter. | Applicable when the comparative parameter periodically changes. | For the comparative parameter which periodically changes, the similarities may be largely different when values of the comparative parameter are only slightly different, or may be substantially the same when they are largely different. This shape overcomes this trouble and provides a proper judgment on the similarity. |

The similarity factor $a_{k1}$ is calculated based on the similarity function using the X coordinate of the point $P_{01}$ in the trend graph $A_0$ as the reference parameter and the X coordinate of the point $P_{k1}$ in the trend graph $A_k$ as the comparative parameter. Likewise, the similarity factors $a_{k2}$ and $a_{k3}$ are calculated based on the similarity function using the X coordinates of the points $P_{02}$ and $P_{03}$ in the trend graph $A_0$ as the reference parameters and the X coordinates of the points $P_{k2}$ and $P_{k3}$ in the trend graph $A_k$ as the comparative parameters, respectively. The constant d is set to be substantially equal to an average of the number of wafers processed by the apparatus 1 every two days.

At step S132, the similarity factors $e_{k1}$, $e_{k2}$, and $e_{k3}$ with regard to the number of particles are calculated. The similarity factor $e_{k1}$ indicates the similarity of the Y coordinate of the point $P_{k1}$ in the trend graph $A_k$ to the Y coordinate of the point $P_{01}$ in the trend graph $A_0$. Likewise, the similarity factors $e_{k2}$ and $e_{k3}$ indicate the similarities of the Y coordinates of the points $P_{k2}$ and $P_{k3}$ in the trend graph $A_k$ to the Y coordinates of the points $P_{d02}$ and $P_{03}$ in the trend graph $A_0$, respectively.

As in step S131, the similarity factors $e_{k1}$, $e_{k2}$, and $e_{k3}$ are calculated based on the similarity function using the Y coordinates of the points $P_{01}$, $P_{02}$, and $P_{03}$ as the reference parameters and the Y coordinates of the points $P_{k1}$, $P_{k2}$, and $P_{k3}$ as the comparative parameters, respectively. The constant d is set to be substantially equal to the reference deviation of the number of particles.

At step S133, the similarity factors $f_{k1}$, $f_{k2}$, and $f_{k3}$ with regard to the slope of the approximate straight line are calculated. The similarity factor $f_{k1}$ indicates the similarity of the slope of the approximate straight line $L_{k1}$ in the trend graph $A_k$ to the slope of the approximate straight line $L_{01}$ in the trend graph $a_0$. Likewise, the similarity factors $f_{k2}$ and $f_{k3}$ indicate the similarities of the slopes of the approximate straight lines $L_{k2}$ and $L_{k3}$ in the trend graph $A_k$ to the slopes of the approximate straight lines $L_{02}$ and $L_{03}$ in the trend graph $A_0$.

As in step S131, the similarity factors $f_{k1}$, $f_{k2}$, and $f_{k3}$ are calculated based on the similarity function using the slopes of the approximate straight lines $L_{01}$, $L_{02}$, and $L_{03}$ as the reference parameters and the slopes of the approximate straight lines $L_{k1}$, $L_{k2}$, and $L_{k3}$ as the comparative parameters, respectively. The constant d is set so that the slope of the approximate straight line used as the comparative parameter will be in the range of $-45°$ to $+45°$ from the slope of the approximate straight line used as the reference parameter.

At step S134, the similarity $S_k$ is calculated according to equation (1) below based on the similarity factors $a_{k1}$, $a_{k2}$, and $a_{k3}$ with regard to the number of wafers processed, the similarity factors $e_{k1}$, $e_{k2}$, and $e_{k3}$ with regard to the number of particles, and the similarity factors $f_{k1}$, $f_{k2}$, and $f_{k3}$ with regard to the slope of the approximate straight lines.

$$S_k = a_{k1} \cdot e_{k1} \cdot f_{k1} + a_{k2} \cdot e_{k2} \cdot f_{k2} + a_{k3} \cdot e_{k3} \cdot f_{k3} \tag{1}$$

In equation (1), it is also considered that the first, second, and third terms of the right-hand side thereof represent the similarities of the regions $R_{k1}$, $R_{k2}$, and $R_{k3}$ to the regions $R_{01}$, $R_{02}$, and $R_{03}$, respectively. As is evident from equation (1), the similarity factors $a_{k1}$, $a_{k2}$, and $a_{k3}$ with regard to the number of wafers processed act as a weight for the similarity factors $e_{k1}$, $e_{k2}$, and $e_{k3}$ with regard to the number of particles and the similarity factors $f_{k1}$, $f_{k2}$, and $f_{k3}$ with regard to the slope of the approximate straight line.

At step S135, whether the similarity $S_k$ has been calculated for all of k (k=1, 2, . . . , n) is examined. The steps S131 through S134 are repeated until the similarity $S_k$ has been completed for all of k.

Thus, the similarities $S_1$ to $S_n$ of the trend graphs $A_1$ to $A_n$ to the trend graph $A_0$ are calculated by the similarity calculation portion 4, and the results are sent to the evaluation portion 5.

The evaluation portion 5 calculates a predicted value of the number of particles based on the similarities $S_1$ to $S_n$, and also evaluates whether the resultant predicted value has been appropriate or not by comparing the predicted value with the actual value of the number of particles. In the case where the evaluation portion 5 judges that the predicted value has been inappropriate, it prohibits the use of the measured data adopted for the calculation of the inappropriate predicted value. Thus, past measured data causing inappropriate prediction is prohibited from being used, thereby increasing the accuracy of prediction in a gradual manner.

The process conducted by the evaluation portion 5 will be described. The process includes calculating a predicted value of the number of particles and evaluating the predicted value.

FIG. 15 shows a process of calculating a predicted value of the number of particles.

At step S151, the greatest "available" similarity $S_j$ among the similarities $S_1$ to $S_n$ is selected. The selection of the similarity $S_j$ indicates that the trend graph $A_j$ is determined to be the trend graph most similar to the trend graph $A_0$ among "available" trend graphs. The "available" trend graphs as used herein refer to trend graphs which are not prohibited from being used at step S183 in FIG. 18 to be described later among the past trend graphs $A_1$ to $A_n$. The "available" similarity as used herein refers to similarity calculated based on the "available" trend graph. For example, assume that the similarity $S_3$ is the greatest among the similarities $S_1$ to $S_n$ and the use of the trend graph $A_3$ is prohibited. In this case, the similarity $S_3$ is not selected, because the trend graph $A_3$ which is a basis of the calculation of the similarity $S_3$ is prohibited. In place of the similarity $S_3$, a second greatest similarity is selected.

Figure 18:
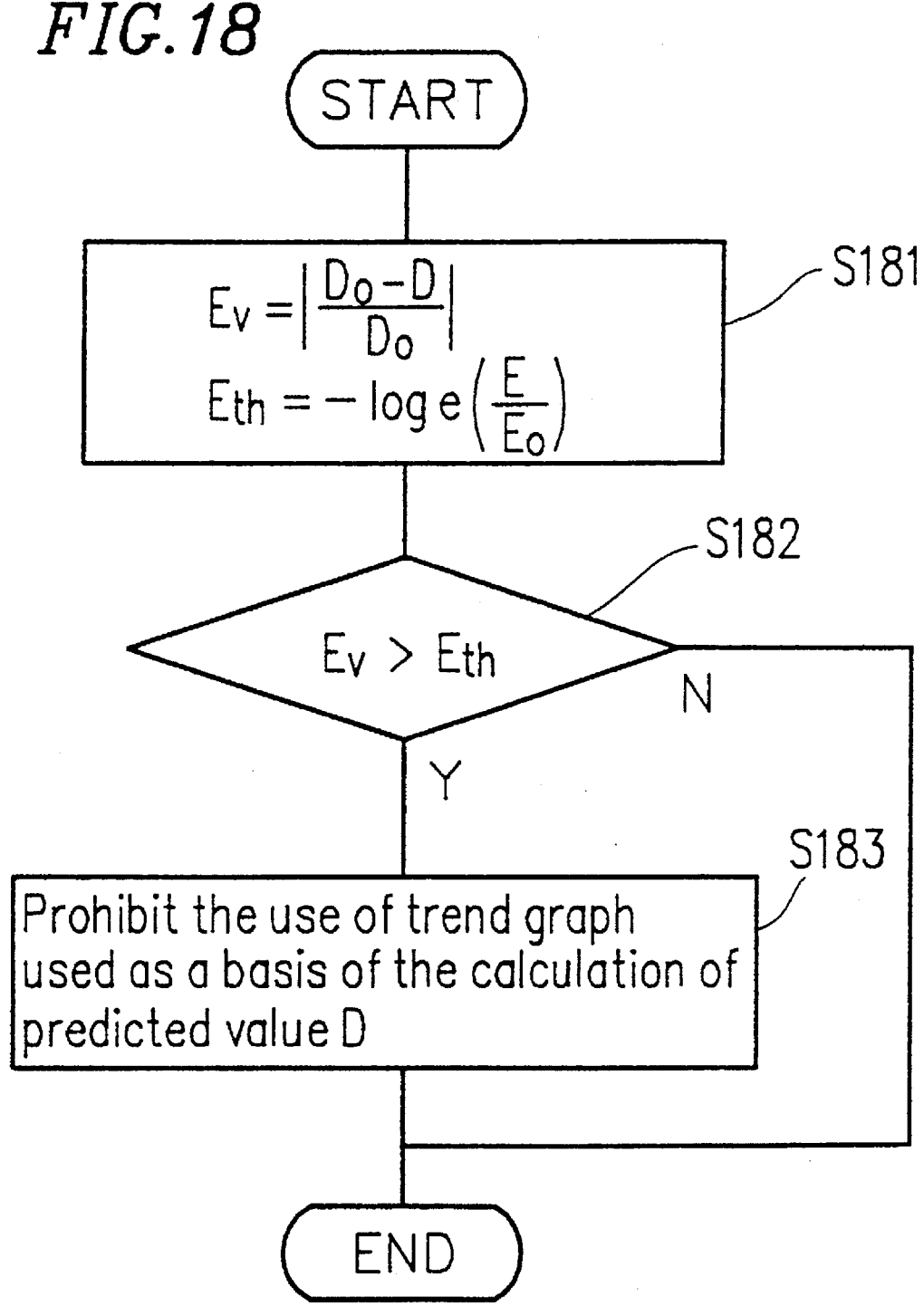
FIG. 18 is a flowchart showing a process of evaluating the predicted value of the number of particles according to the present invention.

At step S152, the similarity selected at step S151 is stored in the storage portion 7, which similarity is to be used for evaluating a predicted value of the number of particles at step S181 in FIG. 18.

Figure 16A:
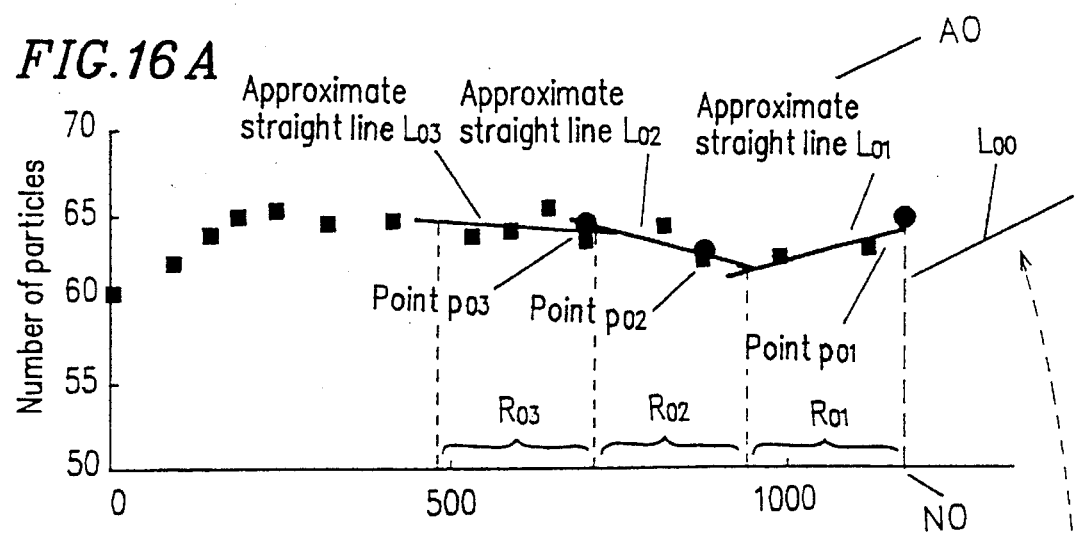
FIGS. 16A and 16B are patterns used for describing how to obtain a predicted straight line from an approximate straight line according to the present invention.
Figure 16B:
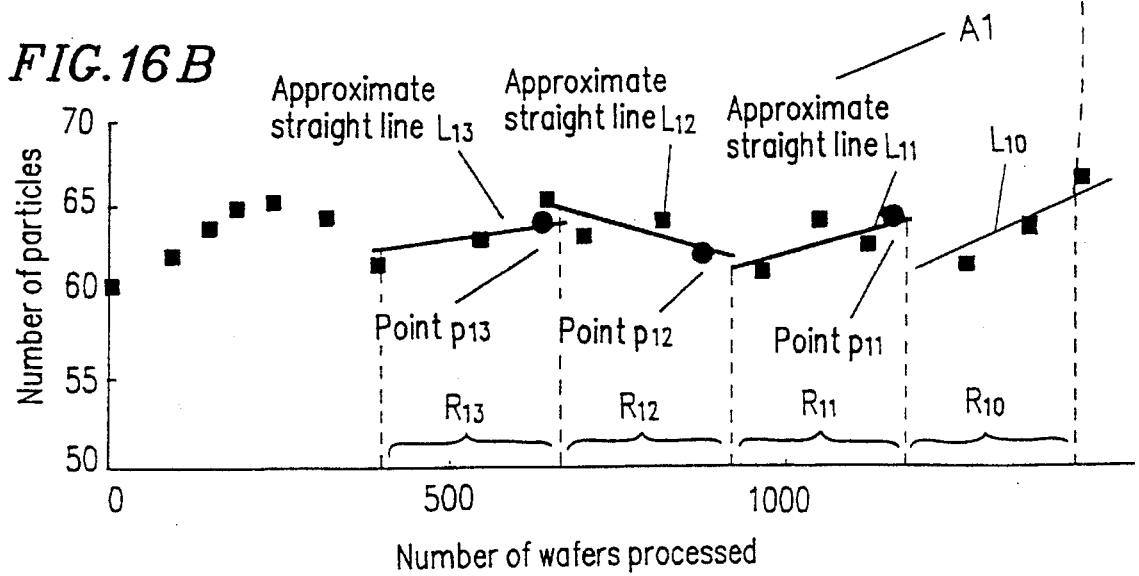

At step S153, a predicted straight line $L_{00}$ is calculated based on the similarity selected at step S151. For example, assume that the similarity $S_1$ has been selected at step S151. In this case, a retgion $R_{10}$ is defined in the trend graph $A_1$ at a place following the region $R_{11}$ as shown in FIG. 16B. Then, an approximate straight line $L_{10}$ in the region $R_{10}$ is calculated in the same manner as was described at step S112 in FIG. 11. In the case where the number of measured data in the region $R_{10}$ is insufficient for calculating the approximate straight line $L_{10}$, the position of the region $R_{10}$ is shifted so as to overlap the adjacent region $R_{11}$. In order to calculate the approximate straight line $L_{10}$ by least square approximation, it is preferable to include at least five pieces of measured data in the region $R_{10}$. The approximate straight line $L_{10}$ thus calculated based on the trend graph most similar to the present trend graph $A_0$ is used as the predicted straight line $L_{00}$ which is expected to show a future trend of the trend graph $A_0$.

At step S154, predicted values for the numbers of particles for coming several days are calculated based on the predicted straight line $L_{00}$. For example, assume that the average number of wafers processed per day by the apparatus 100 is H. In this case, the number of wafers expected to be processed for one day starting from the present time is $N_0+H$. Likewise, the number of wafers expected to be processed for k days starting from the present time is $N_0+k \cdot H$. Seven points corresponding to $N_0+k \cdot H$ when k=1, 2, . . . , 7 are plotted on the predicted straight line $L_{00}$, and the Y coordinates for these seven points are calculated so that predicted values $D_1$, $D_2$, . . . , $D_7$ are obtained. The maximum of k is not limited to 7.

At step S155, the predicted values $D_1$ to $D_7$ to the number of particles are stored in the storage portion 7, which predicted values are to be used at step S181 in FIG. 18 as will be described later. The above expected number of wafers ($N_0+k \cdot H$) and the predicted values $D_k$ (k=1, 2, . . . , 7) are sent to the control portion 6.

FIG. 17 shows an example of the result of the prediction conducted by the prediction control device 100. The X axis represent the number of wafers processed by a dry etching apparatus counted from the latest maintenance. The Y axis represents the number of particles which adhere to the wafer surface during the process by the dry etching apparatus. Black circles connected by a polygonal line represents the present measured data. Black triangles connected by a polygonal line represent the past measured data most similar to the present measured data. Black squares connected by a straight line represent the predicted values.

A predicted value predicted when the number of wafers processed is 731 and an actual value was compared. When the number of wafers actually processed was 800, the prediction error was 3%. Also, a predicted value predicted when the number of wafers processed is 800 and the actually measured value was compared. When the number of wafers actually processed was 861, the prediction error was 5% at the time.

The prediction error is calculated according to equation (2) below:

$$\text{prediction error} = \frac{|\text{predicted value} - \text{actual value}|}{(\text{control maximum value} - \text{control minimum value})} \qquad (2)$$

wherein the control maximum value is the maximum number of particles allowable in the process using a dry etching apparatus, and the control minimum value is equal to zero.

FIG. 18 shows a process of evaluating the predicted value of the number of particles.

At step S181, the predicted value of the number of particles is evaluated according to equations (3) and (4) below:

$$E_v = |(D_0 - D)/d_0| \qquad (3)$$

$$E_{th} = -\log_e(e/E_0) \qquad (4)$$

wherein $D_0$ is the number of particles actually counted, D is the predicted value of the number of particles, $E_0$ is the similarity (constant) obtained when any of the past trend graphs $A_1$ to $A_n$ completely corresponds to the present trend graph $A_0$, and E is the greatest similarity among the "available" similarities used at the calculation of D.

At step S182, whether the value $E_v$ of the left-hand side of equation (3) is greater than the value $E_{th}$ of the left-hand side of equation (4) is examined. When the value $E_v$ is greater than the value $E_{th}$ of the left-hand side of equation (4), the predicted value D is judged to be inappropriate. Equations (3) and (4) are designed so that the predicted value D for the number of particles will be judged to be inappropriate in the case where it is largely different from the actual number of particles $D_0$ even when the similarity of the selected past trend graph to the present trend graph $A_0$ is great. When the value $E_v$ is greater than the value $E_{th}$, the process proceeds to step S183. When the value $E_v$ is equal to or smaller than the value $E_{th}$, the process terminates.

At step S183, the use of the past trend graph adopted for the calculation of the predicted value D is prohibited. This prohibition of the past trend graph may be achieved as follows. As shown in FIG. 19, a flag region 191 is provided for each of the groups in the storage portion 7 for storing a flag indicating whether the corresponding trend graph can be used or not. The content of the flag region 191 is referred to before the corresponding trend graph is read. When "1" is stored in the flag region 191, the use of the corresponding trend graph is prohibited, while, when "0" is stored therein, the use of the corresponding trend graph is allowed. The initial value of the flag is "0". Alternatively, the number of "inappropriate" judgments where the predicted value D calculated based on the corresponding trend graph has judged to be inappropriate may be stored in the flag region 191. In this case, only when the number reaches a predetermined value, the use of the trend graph adopted for the calculation of the predicted value D is prohibited.

The pattern extract from the trend graph of which use has been prohibited (i.e., the "unavailable" trend graph) is not necessary, because the predicted value of the number of particles will not be calculated based on the pattern extracted from the "unavailable" trend graph. Accordingly, the pattern extract portion 3 may pick up only the trend graphs of which use is not prohibited to effect pattern extract by referring to the flag region 191 in the storage portion 7 prior to the pattern extract. This eliminates useless pattern extract operation and thereby improves the process efficiency in the pattern extract portion 3.

Likewise, the calculation of the similarity of the "unavailable" trend graph to the present trend graph is not necessary, because the predicted value of the number of particles will not be calculated based on the similarity of the "unavailable" trend graph to the present trend graph. Accordingly, the similarity calculation portion 4 may calculate only the similarity of the "available" trend graph to the present trend graph by referring to the flag region 191 in the storage portion 7 prior to the calculation. This eliminates useless calculation of the similarity and thereby improves the process efficiency in the similarity calculation portion 4.

The control portion 6 controls the apparatus 1 based on the predicted value of the number of particles. When the predicted value of three days later exceeds a predetermined reference value, the control portion 6 sends a command to the apparatus 1 demanding to stop the operation within two days. Thus, an occurrence where the number of particles exceeds the reference value can be prevented. Alternatively, alarm information may be displayed on the console of the apparatus 1 when the predicted value exceeds a predetermined reference value. Then, the operator can take appropriate measures before the number of particles actually exceeds the reference value.

The apparatus 1 may be connected to a scheduler, which makes a plan when and by which apparatus each lot is to be processed and controls the apparatus 1 based on the plan. In such a case, it may be convenient for the control portion 6 to send the predicted value to the scheduler connected to the apparatus 1. For example, the control portion 6 sends to the scheduler the expected number of wafers to be processed for seven days starting from the present time and the predicted value of the number of particles. The scheduler makes a plan based on the supplied prediction data. When the predicted value of three days later exceeds a predetermined reference value, the scheduler changes the plan giving priority to an urgent lot and terminates the operation of the apparatus 1 within two days.

As described above, the prediction control device 100 of this example calculates a predicted value of a parameter for a condition of the apparatus 1 based on the past measured data. This calculation is effective even when the parameter is measured at irregular intervals. The apparatus 1 is controlled based on the calculated predicted value, so that an abnormal operation of the apparatus 1 can be prevented. The evaluation portion 5 evaluates whether the predicted value has been appropriate or not. If the predicted value is judged to be inappropriate, the use of the past measured data adopted for the calculation of the inappropriate predicted value is prohibited, thereby improving the accuracy of the predicted value.

In this example, the number of wafers processed was used as the parameter representing the time flow. Time itself can also be used instead of the number of wafers. Furthermore, any other parameters can be used instead of the number of wafers as far as they monotonously increase or decrease with a lapse of time. In such cases, effects similar to those described above can also be obtained.

The present invention is also applicable to the prediction control of an apparatus other than the apparatus 1 for fabricating semiconductor devices, where a parameter for a condition of the apparatus is measured at irregular intervals.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

FIG. 21C 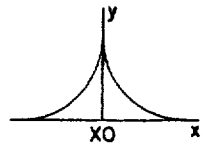

FIG. 21D 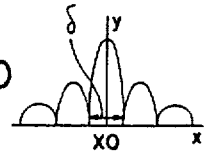

What is claimed is:

1. A method for predictively generating a warning information, comprising the steps of:

a) detecting a value of at least one parameter representing a condition of an object to be controlled at a predetermined time interval, and adding the detected value to a history of one of the at least one parameter;

b) preparing at least one first layer, each of the at least one first layer including a graph representing the history of one of the at least one parameter having an axis representing time;

c) preparing at least one second layer, each of the at least one second layer corresponding to one of the at least one first layer and being divided into a plurality of elements each having a data value of 1 or 0, the data value of each of the plurality of elements being determined based on a positional relationship between the graph in each of the at least one first layer and the plurality of elements in each of the at least one second layer;

d) preparing a third layer from the at least one second layer, the third layer being divided into a plurality of elements each having a data value of 1 or 0, the data value of each of the plurality of elements being determined as a logical OR of all of the data values of the corresponding elements of the at least one second layer;

e) preparing a fourth layer from the third layer and a warning layer stored in a storage means, the fourth layer and the warning layer each being divided into a plurality of elements each having a data value of 1 or 0, the data value of each of the plurality of elements being determined as a logical AND of the data values of the corresponding elements of the third layer and the warning layer;

f) judging whether a ratio of the number of elements having a data value of 1 in the fourth layer to the total number of the plurality of elements in the fourth layer exceeds a predetermined value;

g) storing the data values of the third layer as the data values of the warning layer in the storage means in accordance with a result of the judging in step f); and h) generating a warning information in accordance with a result of the judging in step f).

2. A method according to claim 1, further comprising the steps of:

i) judging whether the detected value of the at least one parameter is within a predetermined reference range which is previously stored in the storage means; and j) generating a warning information in accordance with a result of the judging in step i).

3. A method according to claim 1, wherein the predetermined time interval is either a regular or an irregular time interval.

4. A method for predicting a future value of a parameter, comprising the steps of:

a) detecting values of a plurality of parameters including a time parameter representing the duration of each of a plurality of time intervals, each time interval having a respectively different duration, and storing the detected values of the plurality of parameters in a storage means as a group of time series of data;

b) repeating step a) for (n+1) times so as to obtain (n+1) groups of time series data $G_o$ to $G_n$ in the storage means, wherein the group of time series data $G_o$ is the latest stored data among the (n+1) groups of time series data $G_o$ to $G_n$ and n is an integer that decreases with each repetition of step a);

c) producing (n+1) number of trend graphs $A_o$ to $A_n$ having an axis representing time, which represent the (n+1) groups of time series data $G_o$ to $G_n$, respectively;

d) calculating a similarity $S_k$ between the trend graph $A_o$ and the trend graph $A_k$ using a similarity $a_k$ between a value of the time parameter in the group of time series data $G_o$ and a value of the time parameter in the group of time series data $G_k$ as a weight, the similarity $a_k$ being determined as a function of the difference between the value of the time parameter in the group of time series data $G_o$ and the value of the time parameter in the group of time series data $G_k$, wherein k is an integer between 1 and n and identifies the specific group of time series data from step a) and b) that is being utilized in step d);

e) repeating step d) for k=1 to n, so as to obtain n number of similarities $S_1$ to $S_n$;

f) predicting a future value of each of the plurality of parameters other than the time parameter with respect to the trend graph $A_o$, based on a similarity $S_j$ which is maximum among the similarities $S_l$ to $S_n$, wherein j is an integer between 1 and n and identifies the specific similarity from steps d) and e) that is maximum; and g) evaluating the future value of each of the plurality of parameters other than the time parameter predicted in step f) by comparing the future value with a value of each of the plurality of parameters other than the time parameter which is actually detected after performing step f).

5. A method according to claim 4, wherein step d) includes the steps of:

d1) obtaining a line $L_k$ which approximates a portion of the trend graph $A_k$;

d2) obtaining an X-coordinate of a point $P_k$ on the line $L_k$;

d3) obtaining a Y-coordinate of the point $P_k$ on the line $L_k$;

d4) repeating steps d1) through d3) for k=0 to n, so as to obtain the lines $L_o$ to $L_n$, the X-coordinates of the points $p_o$ to $p_n$ and the Y-coordinates of the points $p_o$ to $p_n$; and d5) calculating the similarity $S_k$ between the trend graph $A_o$ and the trend graph $A_k$, based on a first similarity factor between the X-coordinate of the point $p_o$ and the X-coordinate of the point $p_k$, a second similarity factor between the Y-coordinate of the point $p_o$ and the Y-coordinate of the point $p_k$ and a third similarity factor between a slope of the line $L_o$ and a slope of the line $L_k$, wherein k is an integer between 1 and n and identifies the specific group of time series data from step a) and b) that is being utilized in step d).

6. A method according to claim 5, wherein one of either a trigonometric function or a normal distribution function is used to calculate at least one of the group consisting of the first similarity factor, the second similarity factor and the third similarity factor.

7. A method according to claim 4, wherein one of either a trigonometric function or a normal distribution function is used as a function of the difference between the value of the time parameter in the group of time series data $G_o$ and the value of the time parameter in the group of time series data $G_k$.

8. A method according to claim 4, further comprising the step of:

prohibiting the use of a group of time series data from which the future value is derived, in accordance with a result of evaluating the timbre value.

9. An apparatus for predictively generating a warning information, comprising:

detecting means for detecting a value of at least one parameter representing a condition of an object to be controlled at a predetermined time interval, and for adding the detected value to a history of one of the at least one parameter;

means for preparing at least one first layer, each of the at least one first layer including a graph representing the history of one of the at least one parameter having an axis representing time;

means for preparing at least one second layer, each of the at least one second layer corresponding to one of the at least one first layer and being divided into a plurality of elements each having a data value of 1 or 0, the data value of each of the plurality of elements being determined based on a positional relationship between the graph in each of the at least one first layer and the plurality of elements in each of the at least one second layer;

means for preparing a third layer from the at least one second layer, the third layer being divided into a plurality of elements each having a data value of 1 or 0, the data value of each of the plurality of elements being determined as a logical OR of all of the data values of the corresponding elements of the at least one second layer;

means for preparing a fourth layer from the third layer and a warning layer stored in a storage means, the fourth layer and the warning layer each being divided into a plurality of elements each having a data value of 1 or 0, the data value of each of the plurality of elements being determined as a logical AND of the data values of the corresponding elements of the third layer and the warning layer;

judging means for judging whether a ratio of the number of elements having a data value of 1 in the fourth layer to the total number of the plurality of elements in the fourth layer exceeds a predetermined value;

means for storing the data values of the third layer as the data values of the warning layer in the storage means in accordance with a judging result in the judging means; and means for generating a warning information in accordance with a judging result in the judging means.

10. An apparatus according to claim 9 further comprising:

further judging means for judging whether the detected value of the at least one parameter is within a predetermined range which is previously stored in the storage means; and means for generating a warning information in accordance with a judging result in the flirther judging means.

11. An apparatus according to claims 9, wherein the predetermined time interval is either a regular or an irregular time interval.

12. An apparatus for predicting a future value of a parameter, comprising:

detecting means for detecting values of a plurality of parameters including a time parameter representing the duration of each of a plurality of time intervals, each time interval having a respectively different duration, and storing the detected values of the plurality of parameters in a storage means as a group of time series of data, the detecting means repeating the detection of the value of the plurality of parameters for (n+1) times so as to obtain (n+1) groups of time series data $G_o$ to $G_n$ in the storage means, wherein the group of time series data $G_o$ is the latest stored data among the (n+1) groups of time series data $G_o$ to $G_n$ and n is an integer that decreases with each repetition of the detection;

means for producing (n+1) number of trend graphs $A_o$ to $A_n$ having an axis representing time, which represent the (n+1) groups of time series data $G_o$ to $G_n$, respectively;

calculating means for calculating a similarity $S_k$ between the trend graph $A_o$ and the trend graph $A_k$ using a similarity $a_k$ between a value of the time parameter in the group of time series data $G_o$ and a value of the time parameter in the group of time series data $G_k$ as a weight, the similarity $a_k$ being determined as a function of the difference between the value of the time parameter in the group of time series data $G_o$ and the value of the time parameter in the group of time series data $G_k$, the calculating means repeating the calculation of the similarity $S_k$ for k=1 to n, so as to obtain n number of similarities $S_l$ to $S_n$; and predicting means for predicting a future value of each of the plurality of parameters other than the time parameter with respect to the trend graph $A_o$, based on a similarity $S_j$ which is maximum among the similarities $S_1$ to $S_n$, wherein j is an integer between 1 and n and identifies the specific similarity that is maximum; and means for evaluating the future value of each of the plurality of parameters other than the time parameter predicted by the predicting means by comparing the future value with a value of each of the plurality of parameters other than the time parameter which is actually detected after the future value of each of the plurality of parameters other than the time parameter is predicted by the predicting means.

13. An apparatus according to claim 12, wherein the calculating means includes:

means for obtaining a line $L_k$, which approximates a portion of the trend graph $A_k$, for obtaining an obtaining an X-coordinate of a point $P_k$ on the line $L_k$, and for obtaining a Y-coordinate of the point $p_k$ on the line $L_k$ for k=0 to n, so as to obtain the lines $L_o$ to $L_n$, the X-coordinates of the points $p_o$ to $p_n$; and the Y-coordinates of the points $p_o$ to $p_n$; and means for calculating the similarity $S_k$ between the trend graph $A_o$ and the trend graph $A_k$, based on a first similarity hctor between the X-coordinate of the point $p_o$ and the X-coordinate of the point $p_k$, a second similarity factor between the Y-coordinate of the point $p_o$ and the Y-coordinate of the point $p_k$ and a third similarity factor between a slope of the line $L_o$ and a slope of the line $L_k$.

14. An apparatus according to claim 13, wherein one of either a trigonometric function or a normal distribution function is used to calculate at least one of the group consisting of the first similarity factor, the second similarity factor and the third similarity factor.

15. An apparatus according to claim 12, wherein one of either a trigonometric function or a normal distribution function is used as a function of the difference between the value of the time parameter in the group of time series data $G_o$ and the value of the time parameter in the group of time series data $G_k$.

16. An apparatus according to claim 12, further comprising:

means for prohibiting the use of a group of time series data frown which the future value is derived, in accordance with a result of evaluating the future value.

17. A method for predictively generating a warning information, comprising the steps of:

a) detecting a value of at least one parameter representing a condition of an object to be controlled at a predetermined time interval, and adding the detected value to a history of one of the at least one parameter;

b) preparing at least one first layer, each of the at least one first layer including a graph representing the history of one of the at least one s parameter having an axis representing time;

c) preparing at least one second layer, each of the at least one second layer corresponding to one of the at least one first layer and being divided into a plurality of elements each having a data value of 1 or 0, the data value of each of the plurality of elements being determined based on a positional relationship between the graph in each of the at least one first layer and the plurality of elements in each of the at least one second layer;

d) preparing a third layer from the at least one second layer, the third layer being divided into a plurality of elements each having a data value of 1 or 0, the data value of each of the plurality of elements being determined as a logical OR of all of the data values of the corresponding elements of the at least one second layer;

e) judging whether the third layer satisfies a predetermined condition;

f) storing the data values of the third layer as the warning layer in a storage means in accordance with a result of the judging in step e); and g) generating a warning information in accordance with a result of the judging in step e).

18. A method for predicting a future value of a parameter, comprising the steps of:

a) detecting values of a plurality of parameters including a time parameter representing the duration of each of a plurality of time intervals, each time interval having a respectively different duration, and storing the detected values of the plurality of parameters in a storage means as a group of time series of data;

b) repeating step a) for (n+1) times so as to obtain (n+1) groups of time series data $G_o$ to $G_n$ in the storage means, wherein the group of time series data $G_o$ is the latest stored data among the (n+1) groups of time series data $G_o$ to $G_n$ and n is an integer;

c) producing (n+1) number of trend graphs $A_o$ to $A_n$ having an axis representing time, which represent the (n+1) groups of time series data $G_o$ to $G_n$, respectively;

d) calculating a similarity $S_k$ between the trend graph $A_o$ and the trend graph $A_k$ using a similarity $a_k$ between a value of the time parameter in the group of time series data $G_o$ and a value of the time parameter in the group of time series data $G_k$ as a weight, the similarity $a_k$ being determined as a function of the difference between the value of the time parameter in the group of time series data $G_o$ and the value of the time parameter in the group of time series data $G_k$, wherein k is an integer between 1 and n and identifies the specific group of time series data from step a) and b) that is being utilized in step d);

e) repeating step d) for k=1 to n, so as to obtain n number of similarities $S_1$ to $S_n$; and f) predicting a future value of each of the plurality of parameters other than the time parameter with respect to the trend graph $A_o$, based on a similarity $S_j$ which is maximum among the similarities $S_1$ to $S_n$, wherein j is an integer between 1 and n and identifies the specific similarity from steps d) and e) that is maximum.

19. An apparatus for predictively generating a warning information, comprising:

detecting means for detecting a value of at least one parameter representing a condition of an object to be controlled at a predetermined time interval, and for adding the detected value to a history of one of the at least one parameter;

means for preparing at least one first layer, each of the at least one first layer including a graph representing the history of one of the at least one parameter having an axis representing time;

means for preparing at least one second layer, each of the at least one second layer corresponding to one of the at least one first layer and being divided into a plurality of elements each having a data value of 1 or 0, the data value of each of the plurality of elements being determined based on a positional relationship between the graph in each of the at least one first layer and the plurality of elements in each of the at least one second layer;

means for preparing a third layer from the at least one second layer, the third layer being divided into a plurality of elements each having a data value of 1 or 0, the data value of each of the plurality of elements being determined as a logical OR of all of the data values of the corresponding elements of the at least one second layer;

judging means for judging whether the third layer satisfies a predetermined condition;

means for storing the data values of the third layer as the warning layer in a storage means in accordance with a judging result in the judging means; and means for generating a warning information in accordance with a judging result in the judging means.

20. An apparatus for predicting a future value of a parameter, comprising:

detecting means for detecting values of a plurality of parameters including a time parameter representing the duration of each of a plurality of time intervals, each time interval having a respectively different duration, and storing the detected values of the plurality of parameters in a storage means as a group of time series of data, the detecting means repeating the detection of the value of the plurality of parameters for (n+1) times so as to obtain (n+1) groups of time series data $G_o$ to $G_n$ in the storage means, wherein the group of time series data $G_o$ is the latest stored data among the (n+1) groups of time series data $G_o$ to $G_n$ and n is an integer that decreases with each repetition of the detection;

means for producing (n+1) number of trend graphs $A_o$ to $A_n$ having an axis representing time, which represent the (n+1) groups of time series data $G_o$ to $G_n$, respectively;

calculating means for calculating a similarity $S_k$ between the trend graph $A_o$ and the trend graph $A_k$ using a similarity $a_k$ between a value of the time parameter in the group of time series data $G_o$ and a value of the time parameter in the group of time series data $G_k$ as a weight, the similarity $a_k$ being determined as a function of the difference between the value of the time parameter in the group of time series data $G_o$ and the value of the time parameter in the group of time series data $G_k$, the calculating means repeating the calculation of the similarity $S_k$ for k=1 to n, so as to obtain n number of similarities $S_1$ to $S_n$; and predicting means for predicting a future value of each of the plurality of parameters other than the time parameter with respect to the trend graph $A_o$, based on a similarity $S_j$ which is maximum among the similarities $S_1$ to $S_n$, wherein j is an integer between 1 and n and identifies the specific similarity that is maximum.

* * * * *

UNITED STATES PATENT AND TRADEMARK OFFICE
CERTIFICATE OF CORRECTION

PATENT NO. : 5,621,668
DATED : April 15, 1997
INVENTOR(S) : Nakata

It is certified that error appears in the above-identified patent and that said Letters Patent is hereby corrected as shown below:

On the cover page, item [56], "Kohawa" should be --Kokawa--.

Figure 20:
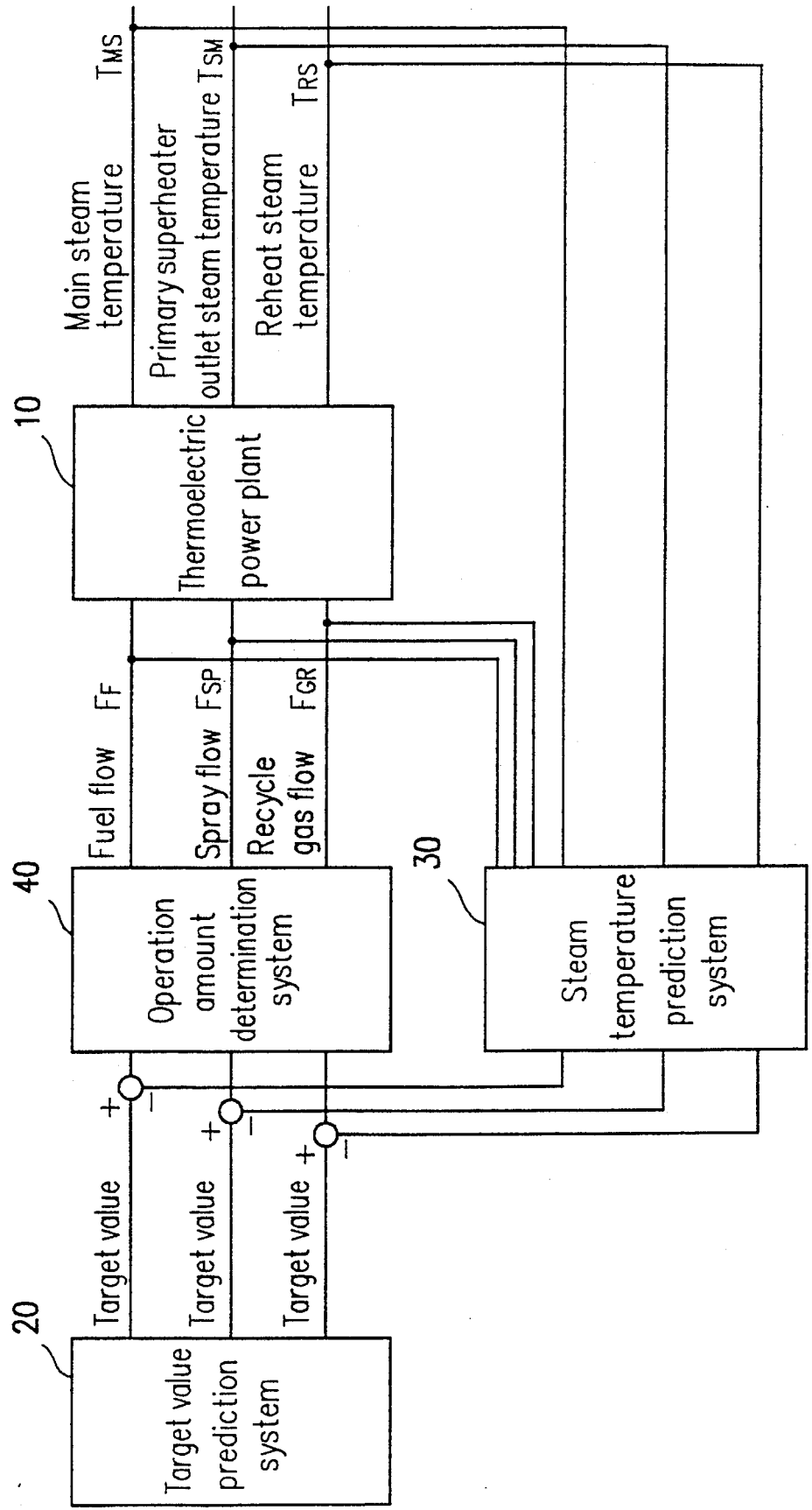
FIG. 20 is a functional block diagram showing a configuration of a conventional prediction control system.

Insert Figs. 21A-21D, as shown on the next two pages, after Fig. 20.

Column 5, line 27, the reference term "cl" should read --c1--.

Column 5, line 59, the reference term "cO" should read --c0--.

Column 7, line 9, after the word "on" delete ".".

Column 9, lines 11, 24, and 26, the reference term "$G_O$" should read --$G_0$--.

Column 17, line 67, the reference term "$S_l$" should be "$S_I$."

Column 18, line 44, the word "timbre" should be --future--.

Column 19, line 30, the word "flirther" should be --further--.

UNITED STATES PATENT AND TRADEMARK OFFICE
CERTIFICATE OF CORRECTION

PATENT NO. : 5,621,668
DATED : April 15, 1997
INVENTOR(S) : Nakata

It is certified that error appears in the above-identified patent and that said Letters Patent is hereby corrected as shown below:

Column 19, line 65, "$S_I$" should be "$S_j$".

Column 20, line 17, the reference term "$P_k$" should be --$p_k$--.

Column 20, line 20, after "$p_n$" delete the semicolon ";".

Column 20, line 24, the word "hctor" should be --factor--.

Column 20, line 44, the word "frown" should be --from--.

Column 20, line 55, after the word "one" delete "s".

Signed and Sealed this

Twenty-third Day of December, 1997

Attest:

*Attesting Officer*

BRUCE LEHMAN

*Commissioner of Patents and Trademarks*

UNITED STATES PATENT AND TRADE MARK OFFICE
CERTIFICATE OF CORRECTION

PATENT NO. : 5,621,668
DATED : April 15, 1997
INVENTOR(S) : Nakata

It is certified that error appears in the above-identified patent and that said Letters Patent is hereby corrected as shown below:

FIG. 21A 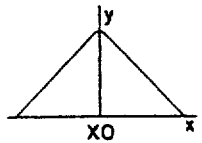

FIG. 21B 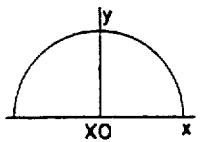

UNITED STATES PATENT AND TRADE MARK OFFICE
CERTIFICATE OF CORRECTION

PATENT NO. : 5,621,668
DATED : April 15, 1997
INVENTOR(S) : Nakata

It is certified that error appears in the above-identified patent and that said Letters Patent is hereby corrected as shown below: